United States Patent
Horn et al.

(10) Patent No.: US 9,471,455 B2
(45) Date of Patent: Oct. 18, 2016

(54) SYSTEM, METHOD, AND COMPUTER PROGRAM PRODUCT FOR MANAGING SOFTWARE UPDATES

(71) Applicant: NetApp, Inc., Sunnyvale, CA (US)

(72) Inventors: Ophir Horn, Waltham, MA (US);
Nancy Walia, Waltham, MA (US);
Jason Sprague, Waltham, MA (US);
Francisco Rosa, Waltham, MA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 14/310,979

(22) Filed: Jun. 20, 2014

(65) Prior Publication Data
US 2015/0178066 A1 Jun. 25, 2015

Related U.S. Application Data

(60) Provisional application No. 61/919,487, filed on Dec. 20, 2013.

(51) Int. Cl.
*G06F 9/445* (2006.01)
*G06F 9/44* (2006.01)
(Continued)

(52) U.S. Cl.
CPC .............. *G06F 11/328* (2013.01); *G06F 8/60* (2013.01); *G06F 8/65* (2013.01); *G06F 8/71* (2013.01); *G06F 11/0793* (2013.01); *G06F 11/2028* (2013.01); *G06F 11/3006* (2013.01); *G06F 11/3452* (2013.01); *G06Q 30/0631* (2013.01); *H04L 41/147* (2013.01); *H04L 41/22* (2013.01); *H04L 43/00* (2013.01); *H04L 43/04* (2013.01); *H04L 43/045* (2013.01); *H04L 43/065* (2013.01); *H04L 43/0894* (2013.01); *H04L 67/34* (2013.01); *H04L 67/36* (2013.01)

(58) Field of Classification Search
CPC .............. G06F 8/60; G06F 8/65; G06F 8/71
See application file for complete search history.

(56) References Cited

U.S. PATENT DOCUMENTS

| 6,694,288 | B2 | 2/2004 | Smocha et al. |
| 6,944,654 | B1 * | 9/2005 | Murphy ................. G06F 11/328 709/201 |

(Continued)

OTHER PUBLICATIONS

Chris Hoffman, What Is a Virtual Machine?, [Online] Jul. 18, 2012, [Retrieved from the Internet] <http://www.makeuseof.com/tag/virtual-machine-makeuseof-explains/> 6 pages total.*

(Continued)

*Primary Examiner* — Thuy Dao
*Assistant Examiner* — Ravi K Sinha
(74) *Attorney, Agent, or Firm* — Klein, O'Neill & Singh, LLP

(57) ABSTRACT

A method performed by a monitoring tool in a computer system, the method including: identifying a software update applied to a plurality of computer system assets, retrieving a first status of a first one of the assets from a first time period before the software update was applied to the first asset, retrieving a second status of the first asset from a second time period after the software update was applied to the first asset, determining a first effectiveness of the software update for the first asset based on comparing the first status and the second status, and displaying within a Graphical User Interface (GUI) an identification of the software update, an identification of the first asset, and a recommendation for the software update based on the first effectiveness.

20 Claims, 12 Drawing Sheets

(51) Int. Cl.

| | |
|---|---|
| *G06F 11/32* | (2006.01) |
| *H04L 12/26* | (2006.01) |
| *G06F 11/07* | (2006.01) |
| *G06F 11/20* | (2006.01) |
| *G06F 11/30* | (2006.01) |
| *G06F 11/34* | (2006.01) |
| *H04L 12/24* | (2006.01) |
| *H04L 29/08* | (2006.01) |
| *G06Q 30/06* | (2012.01) |

(56) References Cited

U.S. PATENT DOCUMENTS

| | | | |
|---|---|---|---|
| 7,509,229 B1 | 3/2009 | Wen | |
| 7,703,091 B1* | 4/2010 | Martin | G06F 8/61 |
| | | | 717/172 |
| 7,752,301 B1 | 7/2010 | Maiocco et al. | |
| 7,827,154 B1* | 11/2010 | Spertus | G06F 11/079 |
| | | | 707/689 |
| 7,844,701 B2* | 11/2010 | Ramany et al. | 709/224 |
| 8,176,483 B2* | 5/2012 | Hoefler et al. | 717/173 |
| 8,381,208 B2* | 2/2013 | Burke et al. | 717/174 |
| 8,813,063 B2* | 8/2014 | Uthe | 717/174 |
| 9,239,715 B1* | 1/2016 | Jaisinghani | G06F 8/65 |
| 9,348,573 B2* | 5/2016 | Lightner | G06F 8/65 |
| 2002/0049687 A1 | 4/2002 | Helsper et al. | |
| 2003/0135382 A1* | 7/2003 | Marejka | G06F 11/328 |
| | | | 709/232 |
| 2004/0210653 A1* | 10/2004 | Kanoor | G06F 8/65 |
| | | | 709/223 |
| 2004/0243636 A1 | 12/2004 | Hasiewicz et al. | |
| 2004/0267718 A1 | 12/2004 | Milligan et al. | |
| 2006/0075276 A1* | 4/2006 | Kataria | G06F 8/65 |
| | | | 714/47.1 |
| 2007/0027985 A1* | 2/2007 | Ramany et al. | 709/224 |
| 2007/0061308 A1 | 3/2007 | Hartwell et al. | |
| 2007/0124465 A1 | 5/2007 | Malloy et al. | |
| 2008/0141240 A1* | 6/2008 | Uthe | 717/174 |
| 2008/0215601 A1* | 9/2008 | Seki | G06F 11/328 |
| 2008/0243862 A1* | 10/2008 | Pathak | G06F 8/60 |
| 2009/0281923 A1 | 11/2009 | Selinger et al. | |
| 2010/0082847 A1* | 4/2010 | Yasui | G06F 8/65 |
| | | | 710/15 |
| 2010/0198845 A1 | 8/2010 | Kutsch et al. | |
| 2010/0318986 A1* | 12/2010 | Burke et al. | 717/176 |
| 2011/0208855 A1* | 8/2011 | Robertson | H04L 41/0853 |
| | | | 709/224 |
| 2012/0129503 A1* | 5/2012 | Lindeman | G06F 8/60 |
| | | | 455/414.1 |
| 2013/0031414 A1 | 1/2013 | Dhuse et al. | |
| 2013/0091168 A1 | 4/2013 | Bhave et al. | |
| 2013/0152047 A1* | 6/2013 | Moorthi | G06F 8/71 |
| | | | 717/124 |
| 2013/0343213 A1 | 12/2013 | Reynolds et al. | |
| 2013/0346841 A1 | 12/2013 | Ahmed et al. | |
| 2014/0013265 A1 | 1/2014 | Goranka | |
| 2014/0143768 A1* | 5/2014 | Kazalski | G06F 8/60 |
| | | | 717/171 |
| 2014/0149973 A1* | 5/2014 | Walter | G06F 8/71 |
| | | | 717/170 |
| 2014/0280894 A1 | 9/2014 | Reynolds et al. | |
| 2015/0067143 A1 | 3/2015 | Babakhan et al. | |
| 2015/0312283 A1 | 10/2015 | Edwards et al. | |

OTHER PUBLICATIONS

Massie et al., The ganglia distributed monitoring system: design, implementation, and experience, [Online] Jul. 2007, Parallel Computing vol. 30, Issue 7, Jul. 2004, [Retrieved from the Internet] <http://dx.doi.org/10.1016/j.parco.2004.04.001> pp. 817-840.*

G. Pruett et al., BladeCenter systems management software, [Online] 2005, IBM Journal of Research and Development, vol. 49, No. 6, Nov. 2005, [Retrievied from the Internet] <http://ieeexplore.ieee.org/stamp/stamp.jsp?tp=&arnumber=5388766&isnumber=5388752> pp. 963-975.*

Lindquist et al., IBM Service Management architecture, [Online] 2007, IBM Systems Journal, vol. 46, No. 3, 2007, [Retrieved from the Internet] <http://ieeexplore.ieee.org/stamp/stamp.jsp?tp=&arnumber=5386569&isnumber=5386558> pp. 423-440.*

Non-Final Office Action mailed Nov. 10, 2015 for U.S. Appl. No. 14/198,332, filed Mar. 5, 2014, 9 pages.

Non-Final Office Action mailed Nov. 20, 2015 for U.S. Appl. No. 14/198,302, filed Mar. 5, 2014, 17 pages.

Notice of Allowance mailed Jan. 29, 2016 for U.S. Appl. No. 14/198,332, filed Mar. 5, 2014, 8 pages.

Non-Final Office Action mailed Feb. 2, 2016 for U.S. Appl. No. 14/310,994, filed Jun. 20, 2014, 16 pages.

Non-Final Office Action mailed Feb. 26, 2016 for U.S. Appl. No. 14/311,011, filed Jun. 20, 2014, 25 pages.

Final Office Action mailed May 5, 2016 for U.S. Appl. No. 14/198,302, filed Mar. 5, 2014.

Notice of Allowance mailed May 6, 2016 for U.S. Appl. No. 14/198,332, filed Mar. 5, 2014.

Final Office Action mailed Aug. 11, 2016 for U.S. Appl. No. 14/310,994.

Final Office Action mailed Aug. 24, 2016 for U.S. Appl. No. 14/311,011.

* cited by examiner

/server/hierarchy/storage/1707?expands=storageNodes.partner ← 2350

```
{
  "self": "/server/hierarchy/storage/1707",
  "name": "aurora",
  "ip": "10.97.12.100",
  ...
},
"storageNodes/5720/partner":
{
  {
    ...
  }
    "_expands": {
      ...
    },
  }
},
"_expands": {
  "storageNodes": {
    "url": "/server/hierarchy/1707/storageNodes",
    "name": "Storage Storage Nodes"
  },
  "latency": {
    "url": "/server/hierarchy/storage/1707/latency",
    "name": "Storage Latency"
  },
  ...
}
}
```

- 2362: self/name/ip block
- 2364: storageNodes/5720/partner block
- 2366: _expands block
- 2360: full response

Fig. 8C

| PATCH | RECOMMENDATION | DETAILS | DEPLOYED SINCE | NUMBER ASSETS |
|---|---|---|---|---|
| IBM SVC | APPROVE PATCH | ASSETS FAILING BEFORE ARE NOW SUCCESSFUL | 3 DAYS | 1 |
| CLARION CLI | ROLLBACK | NEW ERRORS ENCOUNTERED | 7 HOURS | 77 |
| 3Par | VERIFYING... | WAITING FOR ENOUGH CYCLES TO EVALUATE THE PATCH | 11 MINUTES | 77 |
| | | | | |

Fig. 12

| ASSET | PRE-PATCH STATUS | POST-PATCH STATUS | CONCLUSION |
|---|---|---|---|
| ds0 | ALL SUCCESSFUL | ALL SUCCESSFUL | NO CHANGE (SUCCESS) |
| ds1 | POLLING FAILED | ALL SUCCESSFUL | POLLING IS NOW SUCCESSFUL |
| ... | CONFIGURATION FAILED | CONFIGURATION FAILED | CONFIGURATION STILL FAILING (DIFFERENT ERRORS) |
| dsn | CONFIGURATION FAILED | PERFORMANCE FAILED | CONFIGURATION SUCCESSFUL, BUT PERFORMANCE FAILING |

Fig. 13

SYSTEM, METHOD, AND COMPUTER
PROGRAM PRODUCT FOR MANAGING
SOFTWARE UPDATES

CROSS-REFERENCE TO RELATED
APPLICATIONS

The present application claims the benefit of U.S. Provisional Patent Application No. 61/919,487, filed Dec. 20, 2013, and entitled "System, Method, and Computer Program Product for Monitoring Infrastructure and Assets," the disclosure of which is incorporated by reference herein in its entirety.

TECHNICAL FIELD

The present disclosure relates generally to computing system monitoring and, more particularly, to performance sampling in computing systems.

BACKGROUND

Information storage systems may include a variety of different hardware and software components. For instance, a storage system may include one or more storage controllers, where each of the storage controllers provides the low-level control for a plurality of physical storage drives. The storage system may also include network connections and other items that are ancillary to the storage functionality of the system. Storage systems continue to become more and more complex, with storage controllers hosting an increasing number of logical storage volumes and storage controllers being clustered rather than simply standing alone. There is currently a need for a management application that monitors assets of storage systems in an efficient and intuitive manner.

BRIEF DESCRIPTION OF THE DRAWINGS

FIGS. 8A-8C are simplified diagrams of example requests and request results used to access portions of the hierarchical information of FIG. 7 according to one embodiment.

FIG. 12 is a simplified diagram of an example user interface screen for reviewing previously applied patches according to one embodiment.

FIG. 13 is a simplified diagram of an example user interface screen for reviewing how a previously applied patch has impacted assets according to one embodiment.

DETAILED DESCRIPTION

Figure 1:
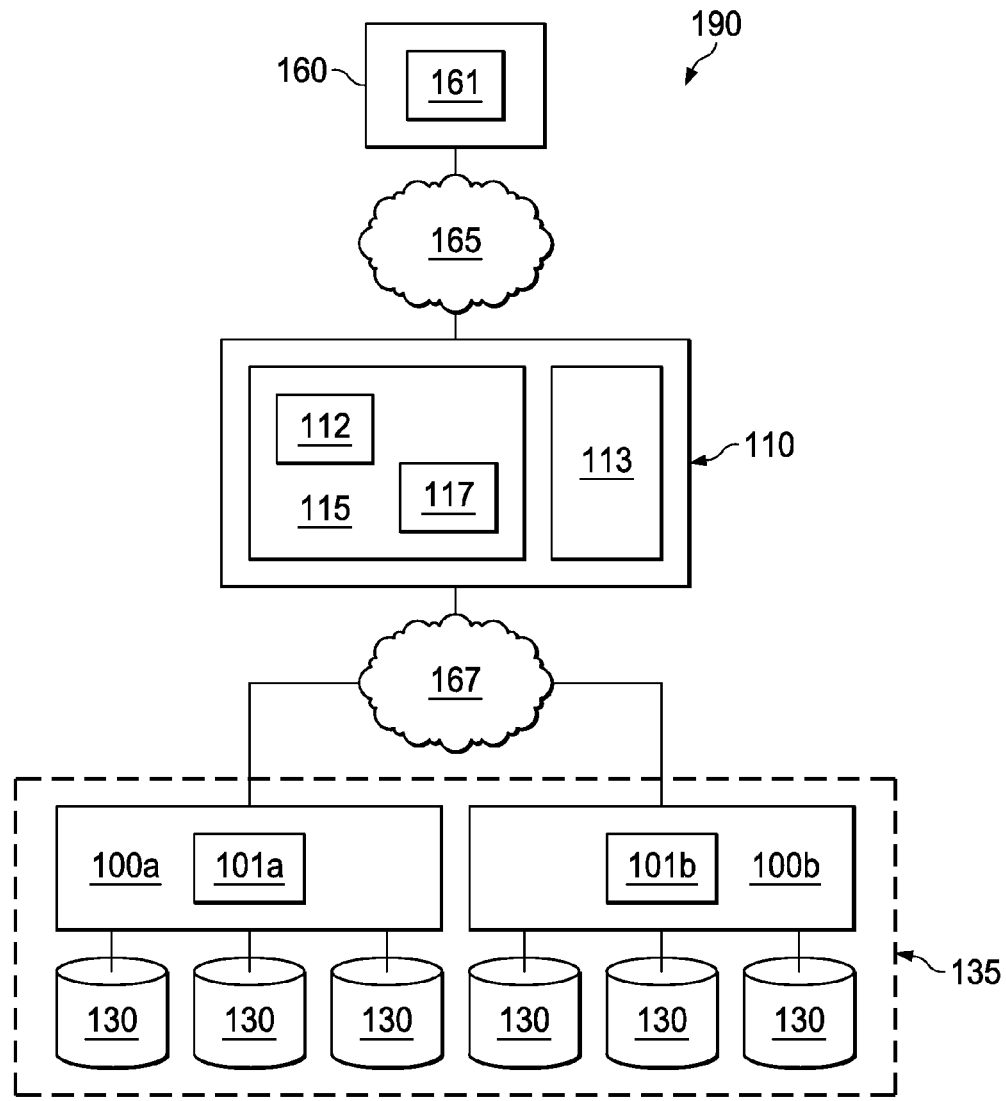
FIG. 1 is a simplified diagram of an example computing system according to one embodiment.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various embodiments of the present disclosure provide monitoring of a computer system that is both efficient and easy to understand for a human user. One embodiment includes a user interface that provides graphing of performance metric data for multiple system assets. For example, a storage system may include multiple storage drives, virtual volumes, network connections, switches, and virtual machines, among other assets. For a performance metric, such as latency, the data for that metric for multiple assets is overlaid on a graph. A human user has a convenient visual comparison tool in the overlaid graph.

Additional features of the graphing user interface may include a correlation algorithm that compares performance metric data for other assets in the computer system and selects ones of those assets with the highest correlation. The selected assets are then automatically listed for the user with an indication of correlation value. The user can also search for and select additional assets and add performance data to the overlaid data in the graphs for those selected assets as well.

To display the performance metric data, determine correlations, and to perform other tasks, the monitoring system accesses and displays information associated with storage systems and the components, assets, and elements in those storage systems. This information is often arranged hierarchically and contains descriptions of the properties that each of the assets has as well as the associations and interrelationships between and among the assets. This hierarchy of information is typically collected and stored so that it may be retrieved for later analysis and use. To support access to this information, a flexible interface for retrieving portions of the hierarchical information has been developed. The monitoring system may retrieve this hierarchical information by making one or more requests for information using the flexible interface.

The flexible interface allows the monitoring system, or other systems, to retrieve as little or as much of the hierarchical information as it desires to display particular performance metric data, screens, and/or reports. To support this flexible retrieval, information associated with each asset is kept in a record. The record contains two sections, a first section includes the properties of the asset and a second section includes references or links to other assets associated with the component. A basic retrieval request for a record would result in a response that includes both the properties and their values and the references to the other assets. Because particular display screens and reports often include some of the information from the referenced records as well, a more complex request may be made that requests not only the properties and their values, but may also ask for the information in the records of one or more of the references. This allows the monitoring system to easily retrieve information from the records of two or more associated assets with the same request. The interface also supports the ability to make more complex use of the references. Because each record in the hierarchical information typically includes references to other records associated with other assets, the interface supports requests that may specify records that correspond to records referenced by the records referenced by the base record requested, and so forth. As long as the monitoring system knows the relationships among the records, it may make an information request that includes requests for records through any number of chained-together reference linkages from the base asset. This allows the monitoring system to retrieve as little or as much of the hierarchical information describing the storage system as it desires to generate a screen or report without having to make an excessive number of requests or having to sift through large amounts of retrieved information that will not be used for the screen or report.

The management of software and firmware updates, more colloquially referred to as patches, presents significant challenges to the manager or administrator of storage and other systems. Many vendors of assets used in a storage system, such as switches, routers, storage controllers, cache memory systems, storage devices, and/or the like provide patches for updating the various assets. These patches may include fixes for errors, add new features, and so forth to the corresponding assets. Unfortunately, applying these patches does not come without its risk. Each asset receiving the patch may be configured differently so that the patch affects each asset differently. In some cases the patch may improve the functionality and/or performance of the asset and the storage system, and in other cases the patch may reduce the functionality and/or performance of the asset and the storage system. Managing and keeping track of the positive and negative impacts of each patch may become a significant burden to the storage system administrator due to the large numbers of assets in the storage system and large numbers of patches available for those assets.

The monitoring system simplifies many of the management tasks associated with patches and other updates. The monitoring system not only helps the storage system administrator apply the patch, but also keeps a record of each patch and tracks how the patch has affected the status of each of the assets the patch has been applied to. This includes determining the effects that patch has had on each asset including whether the patch has affected the ability of the monitoring system to communicate with or poll the asset and to configure the asset, as well as to determine whether the patch has had an impact on the performance of the asset. The monitoring system does this through a series of easy to use interface screens. A first interface screen facilitates application of a patch by displaying patch information to the screen including information on the types of assets to which the patch may be applied. Based on input from the storage system administrator, the monitoring system may then be used to apply the patch. After the patch is applied, the monitoring system then uses its record of the patches and the tracking of the assets to display a patch management screen that lists each patch, the number of assets that are affected, as well as summaries of any changes in status among the affected assets, and most importantly provides a recommendation on whether the patch may be approved, rolled back, or replaced by another patch. The storage system administrator may also select to see more information on any of the patches using a third screen that lists each of the affected assets, how the tracked status of the asset has changed, if at all, and makes a summary of how the patch has affected each of the assets.

Thus, by using the patch management subsystem of the monitoring system, a storage system administrator is able to quickly and easy see which patches have been applied, which assets are affected, and receive meaningful recommendations regarding whether the patches are to be kept, removed, or replaced.

The example of FIG. 1 below is directed to a network storage system, and the scope of embodiments is applicable to a wide variety of computer systems other than storage systems. Accordingly, the concepts described herein for monitoring and analyzing system data may be applied to computing systems generally.

FIG. 1 is an illustration of a network storage system 190 adapted according to one embodiment. Various embodiments of the present disclosure may be implemented by the network storage system 190, as described in more detail below.

The system 190 includes server system 110 connected to client system 160 via a network 165. The server system 110 accesses storage subsystems 100 that are connected to the server system 110 via a network 167. The storage subsystems 100 are included in a cluster 135. Each storage system 100 in the cluster 135 includes a set of storage devices 130 for storing client data, the storage devices 130 of the cluster 135 providing the shared storage of the storage system 100. Each storage subsystem 100 also includes a storage controller 101. Each storage controller 101 exercises low-level control over physical storage devices 130 to provide virtualized storage to server system 110 and client 160. Examples of storage hardware that can be used as physical storage devices 130 includes, e.g., hard disk drives and solid state drives, though the scope of embodiments is not limited to any particular storage hardware.

Each storage device 130 may store data from logical storage entities such as one or more storage volumes, where each volume has a file system implemented on the volume. A file system implemented on the logical storage entity may provide multiple directories in a single volume, each directory containing various filenames each of which may be mapped to a multitude of storage devices 130.

Client system 160 may run one or more applications (e.g., word processing or database programs, typified by application 161) that utilize the storage system. Client system 160 includes a computer system that interacts with server system 110 for submitting read/write access requests and for receiving or transmitting data from or to the server system 110 over the network 165. In a virtual server environment, application 161 on client system 160 may interact over the network 165 with one or more virtual machines (VMs) 115 executing on server system 110.

As mentioned above, various embodiments include a system monitoring tool that receives data from the system assets, monitors performance of the system assets, and provides user access to analyzed system data. System 190 includes a system monitoring tool that is implemented as an application. For instance, a system monitoring tool can be implemented as application 161 at client 160. Additionally or alternatively, the system monitoring tool may be implemented as one of applications 112, 117. For the purposes of this example, application 117 is described as the system monitoring tool. The system monitoring tool 117 receives system data by communicating with storage operating systems at each storage controller 101. For instance, system monitoring tool 117 may communicate via API to receive system information, such as hardware names, volume names, usage data, read and write operations per second, and the like. Various types of system information are described in more detail below. In short, the system information of this example includes any type of information that allows the monitoring tool 117 to construct a comprehensive description of the architecture and performance of system 190.

Server system 110 includes a computer system that executes applications and interacts with the client system 160 for receiving read/write access requests and receiving or transmitting data from or to the client system 160 over the network 165. Server system 110 in this example is connected to the client system 160 over a network 165 such as a local area network (LAN), an Ethernet subnet, a PCI or PCIe subnet, a switched PCIe subnet, a wide area network (WAN), a metropolitan area network (MAN), the Internet, or the like.

The server 110 may include any appropriate computer hardware and software. In one example, server 110 includes a general-purpose computer configured to execute any of a variety of operating systems, including the Unix™, Linux™, and Microsoft Windows™ operating systems.

Server system 110 includes hypervisor 113, which creates and manages one or more Virtual Machines (VMs)—in this case, VM 115. The present example shows only a single VM 115, though in other embodiments, the server 110 includes multiple VMs (not shown), each VM being used by and connected with a client 160 through computer network 165. Thus, systems with more than one client 160 may include more than one VM 115, each client being supported by at least one VM. VM 115 includes an encapsulation or instance of an operating system and applications 112 and 117 executing on top of that instance. Briefly, application 112 provides read/write access to the clients 160 to data stored in cluster 135. Application 117 is a system monitoring tool described in more detail below. In some embodiments, different types of VM hypervisors 113 may be used (e.g., VMware™ ESX, Microsoft™ Hyper-V, etc.).

Each storage system 100 is configured to allow server 110 to access its data, for example, to read or write data to the storage system. The server 110 executes application 112 that "connects" to storage systems 100 over computer network 167 to send an access request (read or write request) to storage system 100 for accessing particular data stored on the storage system 100. The VM application 112 executing on the server 110 services the connected client 160 by receiving the client access requests and submitting the access requests to the storage system 100 for execution.

The scope of embodiments is not limited to the particular architecture of system 190. For instance, other systems may include additional servers, each server being similar to server 110. While the example of FIG. 1 shows only one client 160, it is understood that any appropriate number of clients may be supported by the system 190. Moreover, while cluster 135 shows two storage subsystems 100*a* and 100*b*, it is understood that any appropriate number of controllers and storage drive arrays may be used with various embodiments. For instance, some embodiments may include only a single storage subsystem, whereas other embodiments may include three or more storage subsystems. In other words, the scope of embodiments is not limited to a single storage cluster.

System monitoring tool 117 monitors the assets of system 190, where the assets include any hardware or software component that is included in the architecture of system 190 or affects the performance of the system 190. Examples of assets include the underlying storage drives (e.g., HDDs and SSDs), virtual volumes, storage controllers, storage subsystems, aggregates of storage subsystems, network connections, virtual machines, hypervisors, applications, and the like.

Figure 2:
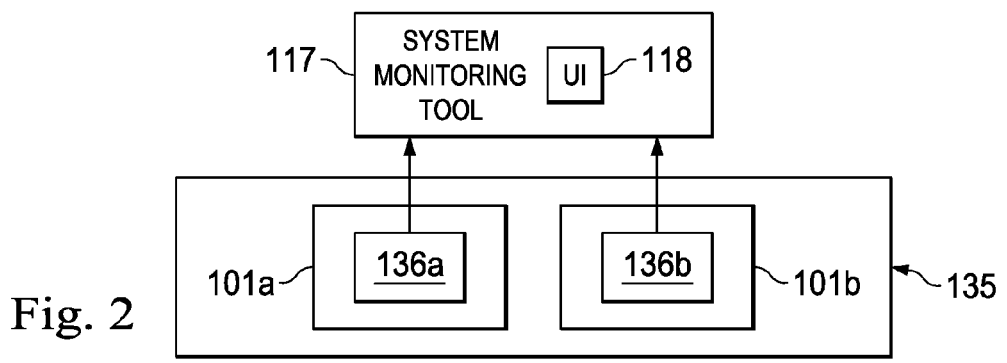
FIG. 2 is a simplified block diagram of an example relationship among applications and a storage cluster according to one embodiment.

FIG. 2 is a block diagram illustration of an exemplary conceptual layout according to one embodiment. Application 117 is a system monitoring application that provides for data collection, analysis, and display for performance aspects of system 190. As explained above with respect to FIG. 1, tool 117 may be run in a VM in a storage server; additionally or alternatively, a performance management tool may be embodied as an application run on a client (not shown) or on any appropriate computer in communication with cluster 135.

A human user interacts with system monitoring tool 117 via UI 118. UI 118 may include a command line interface, a graphical user interface (GUI), or other appropriate interface. The human user may rely on UI 118 for troubleshooting and viewing performance data. For instance, the human user may input information identifying requested performance statistics, identify new assets, and change settings using UI 118. FIGS. 3, 5A, 5B, and 11-13 below describe various example screens that may be displayed by IU 118.

Storage Operating Systems (OSs) 136 run on storage controllers 100 (FIG. 1). The scope of embodiments may include any appropriate OS that provides low-level control to implement virtual storage on storage drives. Storage OS instances 136 run on one or more processors at storage controllers 100. Also, communication between storage OSs 136 and system monitoring tool 117 go through communication links, such as network 167 (FIG. 1).

System monitoring tool 117 automatically imports information on the various infrastructure assets in system 190, providing accurate and real-time visibility of servers, virtual servers, Host Bus Adaptors (HBAs), switches, storage arrays, and the like. In one example, system monitoring tool 117 discovers the assets by polling each of the assets that it is aware of. Each of the deployed assets provides one or more Application Programming Interfaces (APIs) that can be used to request information therefrom. System monitoring tool 117 is programmed to use those APIs to automatically import the information. Imported information can include, but is not limited to, device type, latency, operations per second, faults, and the like. The scope of embodiments is not limited to any particular asset information, and any appropriate asset information may be imported in various embodiments.

Figure 3:
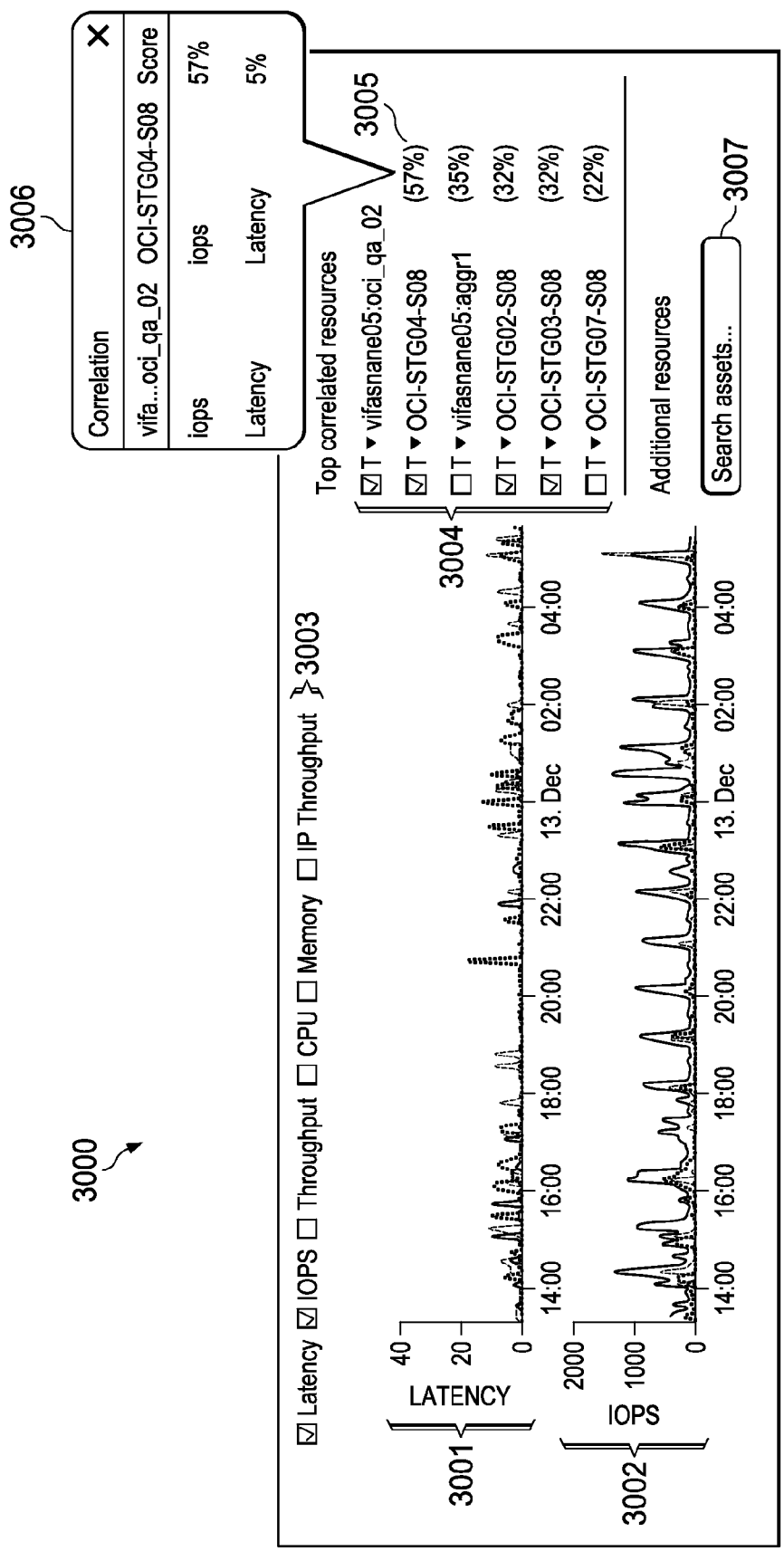
FIG. 3 is a simplified diagram of an example display of system performance information according to one embodiment.

FIG. 3 is an example display 3000 of system performance information according to one embodiment. FIG. 3 may be presented by UI 118 (FIG. 1) on a display screen of a computing device to a human user. The underlying data analysis is performed by system monitoring tool 117 (FIG. 1). FIG. 3 shows a graphical display in which performance information for multiple, different assets is overlaid, thereby providing the human user with intuitive, digestible information.

Display 3000 includes first graph 3001 and second graph 3002. In this example, first graph 3001 includes latency (in msec) plotted on the y-axis against time on the x-axis. First graph 3001 includes four lines, each corresponding to one of the resources with a checkmark in resource list 3004. In some embodiments, the lines in a single graph (such as the four lines in graph 3001) may be provided with a contrasting appearance, such as color coding or different types of lines, so that human user may visually discern one line from another. It is noted in graph 3001 that the four lines are overlaid within the same graph, thereby providing a human user with a convenient way to compare one resource to another.

Further in this example, second graph 3002 includes Input/Output Operations per second (IOPS) on the y-axis against time on the x-axis. Once again, there are four lines overlaid in the graph, allowing a human user to visually compare the performance of the various resources.

Display 3000 provides check boxes 3003 for a human user to select performance metrics to be displayed on graphs. In this example, the user has selected latency and IOPS, and the display 3000 includes one graph 3001 for latency and another graph 3002 for IOPS, accordingly. The user may select any (or none) of latency, IOPS, throughput (e.g., in Gb/sec), CPU usage, memory usage, and IP throughput (network throughput, e.g., in Gb/sec). The scope of embodiments is not limited to any particular set of performance metrics, as those shown in FIG. 3 are exemplary, and other embodiments may include any appropriate set of performance metrics.

In various embodiments graphs are plotted only for relevant performance metrics for a given resource. For example, CPU utilization is generally not relevant to Virtual Machine Disks (VMDKs), so a CPU usage chart will not show performance graph for a VMDK resource, even if the VMDK resource is selected. However, relevant metrics, such as latency, may be visually displayed for the VMDK asset in another chart.

Display 3000 includes a list of resources 3004, where each of the resources corresponds to an asset in a computer system. The resource at the top of list 3004 corresponds to a selected resource of interest (also referred to in this example as a "base resource"). The resources lower in the list 3004 are automatically selected by the system as suggested, correlated resources. The suggested resources are listed underneath the base resource in the order of their correlation percentage with the base resource. By default, the suggested resources are disabled when display 3000 first appears. When the user selects one of the suggested resources to view the performance charts (e.g., by marking a box next to the resource with a check mark), system monitoring application 117 fetches data for that suggested resource and overlays data for its relevant metrics in the charts 3001 and 3002. In one example, color coding is used so that the text for a resource in list 3004 corresponds to a color of a line in graphs 3001 and 3002.

The resource suggestions provided by display 3000 are provided to assist a human user in determining underlying causes of performance increases or decreases. A given system may have hundreds of assets, the vast majority of them uncorrelated in any useful way to a given base resource. Various embodiments provide a technique to allow a human user to focus on the few resources that are most important for explaining performance of the base resource. In this example, system monitoring application 117 automatically selects resources in the system showing a high correlation to the base resource, at least with respect to the performance metrics of interests.

In the present example, the selected performance metrics are latency and IOPS. The system monitoring application 117 selects the suggested resources based on a correlation to the base resource with respect to latency and IOPS. Indicator 3005 shows that the top-most suggested resource has a 57% correlation to the latency metric of the base resource over the time period of graph 3001.

Various embodiments may use any correlation algorithm appropriate for the resources. For instance, a conventional statistical correlation formula may be used to correlate performance metric numbers over the time period of interest. However, two resources both showing zero value for a metric over a long time period may show very nearly one-hundred percent correlation, so some embodiments may eliminate such suggestions to avoid providing useless information. An example of a statistical correlation that may be used by some embodiments includes selecting resources based on their Pearson's population correlation coefficients. The population correlation coefficient $\rho_{X,Y}$ between two random variables X and Y with expected values $\mu_X$ and $\mu_Y$ and standard deviations $\sigma_X$ and $\sigma_Y$ is defined as:

$$\rho_{X,Y} = \text{corr}(X, Y) = \frac{\text{cov}(X, Y)}{\sigma_X \sigma_Y} = \frac{E[(X - \mu_X)(Y - \mu_Y)]}{\sigma_X \sigma_Y},$$

where E is the expected value operator, cov means covariance, and, corr a widely used alternative notation for the correlation coefficient.

Display 3000 also provides more in-depth correlation explanation at tool tip 3006. In this example, the user may review how the score was calculated by selecting the score link and causing tool tip 3006 to appear. Tool tip 3006 displays which metrics (e.g. IOPS and Latency) were correlated between the different resources (e.g LUN and VM).

Figure 4:
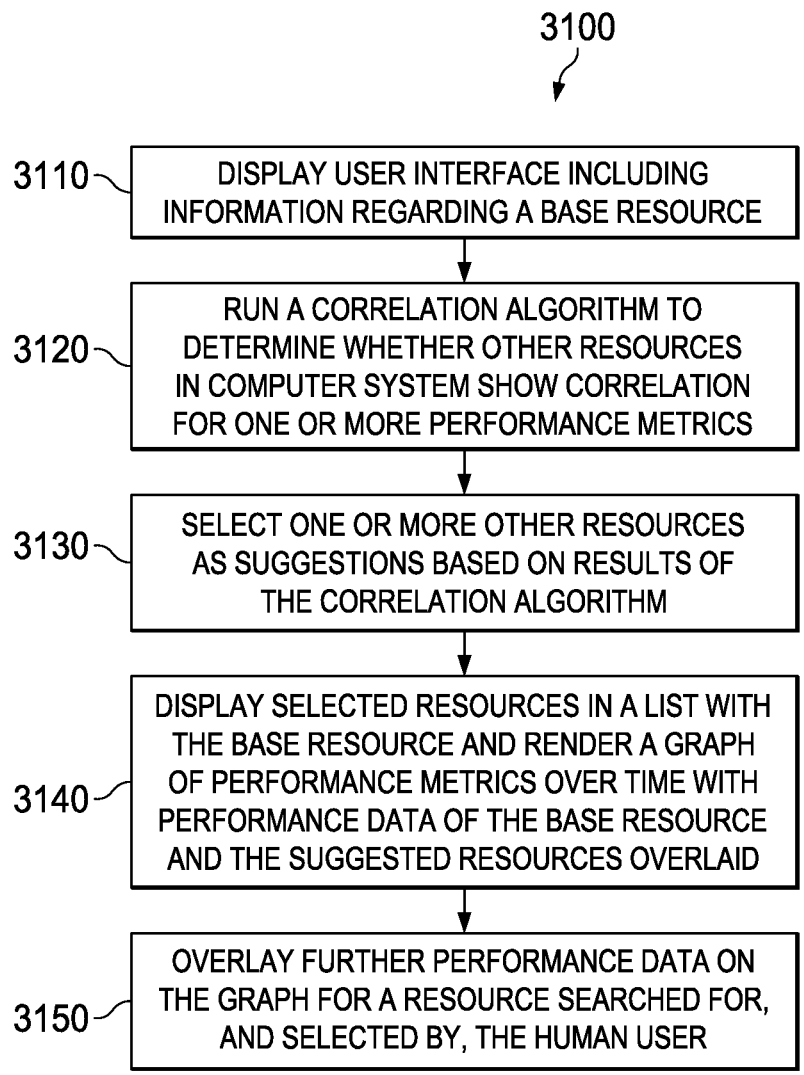
FIG. 4 is an illustration of exemplary process 3100, adapted according to one embodiment.

FIG. 4 is an illustration of exemplary process 3100, adapted according to one embodiment. Process 3100 may be performed, e.g., by a computer that is running system monitoring application 117 and displaying UI 118 on a display screen.

At action 3110, the application displays a user interface including information regarding a base resource. For instance, the user interface may include a landing page that displays a variety of information about a selected resource, such as a description of the resource, a diagram showing connections to the resource, a graph of performance data, and the like.

At action 3120, the application runs a correlation algorithm to determine whether other resources in the computer system show a significant correlation for one or more performance metrics. In one example, the application runs a correlation algorithm for at least a subset of latency, IOPS, throughput, IP throughput, CPU usage, and memory usage and examines correlation coefficients for each of the resources for each of the performance metrics. The application examines the various resources, and if a correlation coefficient for a particular resource is significant (e.g., is above a threshold), the application selects the resource as a suggested resource.

The correlation algorithm of action 3120 can examine any metric or resource in the system. For instance, correlation may be between different computer systems (same type or different types), between different resources in different computer systems (e.g., volumes in different computer systems), and the like. In one example, the virtual machine is the base resource, and the CPU usage of the virtual machine and the latency of a storage volume that is used by the virtual machine are subject to the correlation algorithm. In another example, a storage volume is the base resource, and the its latency is correlated with traffic of a switch port.

At action 3130, the application selects one or more of the other resources as suggested resources based on results of the correlation algorithm. As mentioned above, significant correlation may include a correlation coefficient being greater than a threshold, and the application selects those resources showing significant correlation. An example list of resources is shown as list 3004 in FIG. 3, where the top-most resource is the base resource, and the resources listed there below are the suggested resources. In FIG. 3, those resources showing correlation greater than twenty-one percent are selected as suggested resources, though the threshold for significant correlation may be set at any appropriate value.

Also, as noted above, a resource with a performance metric at zero for a period of time may correlate highly with another resource that has the same performance metric at zero. Action 3130 may include omitting such results from the selected resources.

At action 3140, the application displays the selected resources in a list with the base resource, as in list 3004 of FIG. 3. Additionally, the application renders a graph of performance metrics over time with performance data of the base resource and the suggested resources overlaid on the same graph. Example graphs are shown as graphs 3001 and 3002 of FIG. 3. Action 3140 may also include rendering an indication of a correlation value next to each suggested resource, such as shown in FIG. 3 as correlation indication 3005.

Figure 5A:
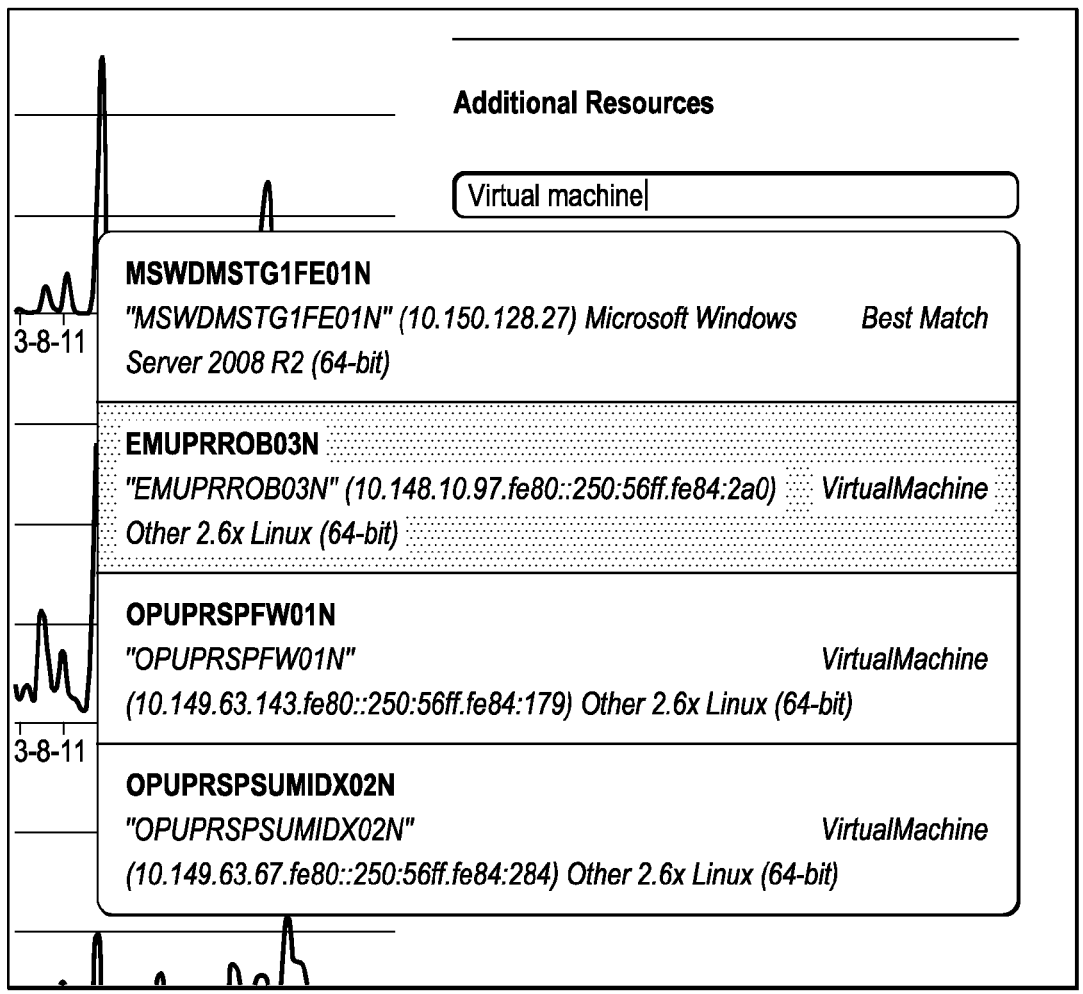
FIGS. 5A and 5B illustrate a use case for a resource search box, according to one embodiment.
Figure 5B:
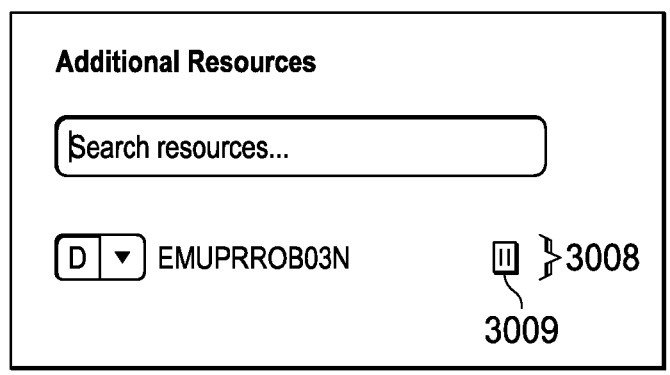

At action 3150, the application overlays further performance data on the graph for a resource that was selected by the human user. As an example, FIG. 3 illustrates "search assets" box 3007, allowing a user to key in a query term or a possible name of a resource. The application includes search logic that returns matching candidates from which the user can select a resource. FIGS. 5A and 5B illustrate a use case for box 3007, according to one embodiment.

In the examples of FIGS. 5A and 5B the user has typed in "Virtual machine" as a query term, and the application has searched its database of assets for resources that match, at least partially, the query term. In this case, the user has selected a resource named "EMUPRROB03N," which is a virtual machine running on Linux. Once selected, the resource appears in a list 3008 of "Additional Resources" below list 3004.

Returning to FIG. 4, action 3150 includes overlaying the performance data for the additional selected resource onto the one or more graphs. As an example, in FIG. 3, the application would overlay latency and IOPS data for the virtual machine EMUPRROB03N onto graphs 3001 and 3002. Although not shown here, a correlation indicator similar to indicator 3005 may be included in list 3008 to provide an indication of correlation of the additional selected resource with the base resource. The user may search for further additional resources if desired. Also, the user may choose to remove the resource that he/she selected by clicking the remove icon 3009 next to the resource. This will not only remove the additional resource from list 3008, but also removes any overlaid data in the graphs for that resource from the view.

Various embodiments may provide advantages over conventional systems. For instance, the overlaying of performance metric data for multiple assets on a single graph (FIG. 3) is not only new, but highly intuitive for a user who wants to compare performance of assets in the system. Overlaying data on a same graph, rather than creating additional graphs for additional assets, saves space on the display, thus using UI real estate economically.

Furthermore, using correlation algorithms to select suggested assets for viewing by the user provides useful information to human users. While the computer system may include hundreds of resources, the correlation algorithm and provision of suggestions supplies the user with a first pass at what is probably the most relevant data to explain the performance results of the base asset.

Moreover, various embodiments also allow a user to search for and add other assets to the display, including overlaying performance data on the graphs. Such feature may give a user flexibility to view any arbitrary asset against the base asset. Such feature may be especially useful for an experienced user with knowledge of the system to look for other assets that may have a bearing on the performance of some other asset but without having passed a correlation threshold.

Figure 6:
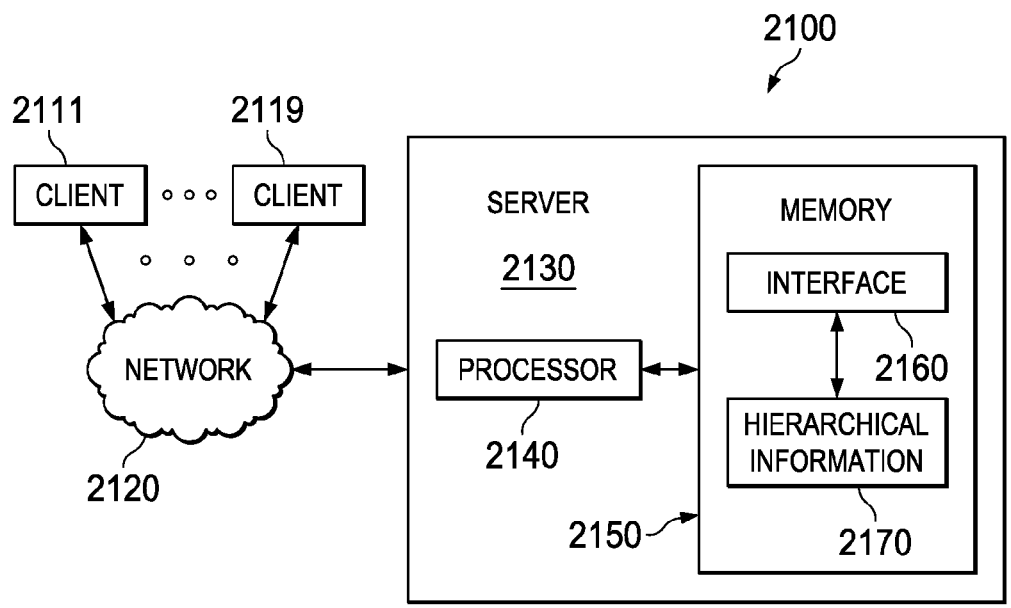
FIG. 6 is a simplified diagram of an example service-oriented architecture (SOA) according to one embodiment.

FIG. 6 is a simplified diagram of an example service-oriented architecture (SOA) 2100. As shown in FIG. 6, SOA 2100 is built around a client-service model. In SOA 2100, requests originate from one or more clients 2111-2119. Each of the clients 2111-2119 may make requests through a network 2120 to a server 2130. In some embodiments, any of the clients may be system monitoring tool 117 (FIG. 1) and the server 2130 may be server 110 (FIG. 1). In an alternative embodiment system monitoring tool 117 may be a client that runs on server 2130, which is consistent with the FIG. 1 example above. The scope of embodiments is not limited to any particular architecture.

Network 2120 may be any kind of network including a local area network (LAN), such as an Ethernet, and/or a wide area network (WAN), such as the internet. In some examples, server 2130 may be a standalone workstation, a cluster, a production server, within a virtual machine, and/or the like. Server 2130 includes a processor 2140 coupled to memory 2150. In some examples, processor 2140 may control operation and/or execution of hardware and/or software on server 2130. Although only one processor 2140 is shown, server 2130 may include multiple processors, CPUs, multi-core processors, field programmable gate arrays (FPGAs), application specific integrated circuits (ASICs), and/or the like. Memory 2150 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 2150 may be used to store an interface 2160 and hierarchical information 2170. Interface 2160 is used by clients 2111-2119 to access the hierarchical information 2170 with clients 2111-2119 being able to make requests for all, or part, of the hierarchical information 2170. Each of the requests is directed to interface 2160 where the requested hierarchical information 2170 is retrieved, and a response is returned to the requesting client 2111-2119. Numerous mechanisms for directing the requests to interface 2160 may be used, including using a parameterized and/or unparameterized uniform resource locator (URL), using an application name corresponding to interface 2160, and/or the like. The requests may also be made using protocols or methods such as application programming interface (API) calls, remote procedure calls, representational state transfer (REST) web services, simple object access protocol (SOAP) web services, and/or the like.

As discussed above and further emphasized here, FIG. 6 is merely an example which should not unduly limit the scope of the claims. One of ordinary skill in the art would recognize many variations, alternatives, and modifications. In some embodiments, other configurations may be used with SOA 2100. In some examples, any of the clients 2111-2119 may be hosted in server 2130. In some examples, the hierarchical information 2170 may be stored outside of memory 2150 or server 2130. For example, the hierarchical information 2170 may be stored in one or more files in a storage module hosted in server 2130 or in another computing device elsewhere in SOA 2100. As another example, the hierarchical information 2170 may be stored in one or more databases stored in one or more database management systems. In some examples, processor 2140 and memory 2150 may be hosted in a virtual machine.

The hierarchical information 2170 may be used to describe various objects, including the properties and/or interrelationships among the objects using one more data structures. The interrelationships may typically be represented using a tree or graph with each node representing an object and each edge representing a relationship. In some examples, each of the nodes may be stored in the hierarchical information 2170 as a record. In some embodiments, the edges may be unidirectional to describe the hierarchy in a top-down style fashion or the edges may be bidirectional to describe the hierarchy in a fashion that can be navigated in any direction. The hierarchical information 2170 may be used to organize and describe systems of any complexity from the simplest to the very complex. As the complexity of the systems being modeled increases, the numbers of nodes and edges, as well as the number of properties for each node may expand rapidly and result in a tree or graph with hundreds, thousands, or even more nodes and edges. Accessing the hierarchical information 2170 may become quite challenging. Interface 2160 may use several approaches to support access to the hierarchical information 2170 by clients 2111-2119.

One approach that interface 2160 may use is to permit access to one node of the hierarchical information 2170 at a time. Each of the requests from clients 2111-2119 includes a name, URL, identifier, and/or the like of the node of interest to interface 2160. Interface 2160 then accesses the one or more data structures storing the hierarchical information 2170, finds the requested node, and prepares a response listing each of the properties of the node, including any edges or links to other nodes in the hierarchical information. This approach leaves the problem of traversing the hierarchical information 2170 to clients 2111-2119, who control how they navigate through the hierarchical information 2170 to obtain the information of interest. As more of the hierarchical information 2170 is desired, clients 2111-2119 end up making more and more requests. In some cases this may be rather inefficient as each request and response adds overhead to the processing used to make and handle each of the requests.

Another approach that interface 2160 may use is to retrieve as much of the hierarchical information 2160 as possible, based on a node included in the request. Using the name, URL, identifier, and/or like of the node included in the request, interface 2160 recursively traverses the hierarchical information 2170 and retrieves and adds to the response as much of the hierarchical information as may be reached from the included node. In some cases, this may include each of the nodes in the hierarchical information 2170. In some embodiments, when the hierarchical information 2170 is a graph, this may add additional complexity to the recursive discovery of interface 2160 to avoid endless cycles or loops. In many cases, this approach may be rather inefficient as the response for each request may include a significant amount of the hierarchical information 2170 that the requesting client 2111-2119 is not interested in. In some examples, the requesting client 2111-2119 may also use significant computing resources to parse the large responses. In some embodiments, the request may be modified to include a maximum depth to recursively traverse in the tree or graph of the hierarchical information, but this may also result in overly large responses as clients 2111-2119 may not be interested in each of the edges from a particular node. This approach is also not effective when information associated with two unrelated or distantly related nodes, or even two nodes in different hierarchies, is desired by requesting client 2111-2119.

An approach that provides more flexibility for clients 2111-2119 when they access the hierarchical information 2170 would be desirable. To better demonstrate this, several examples of flexible requests for hierarchical information are shown using some examples of hierarchical information describing storage systems. For example, this hierarchical information may correspond to the system data for system 190 that is retrieved by system monitoring tool 117.

Figure 7:
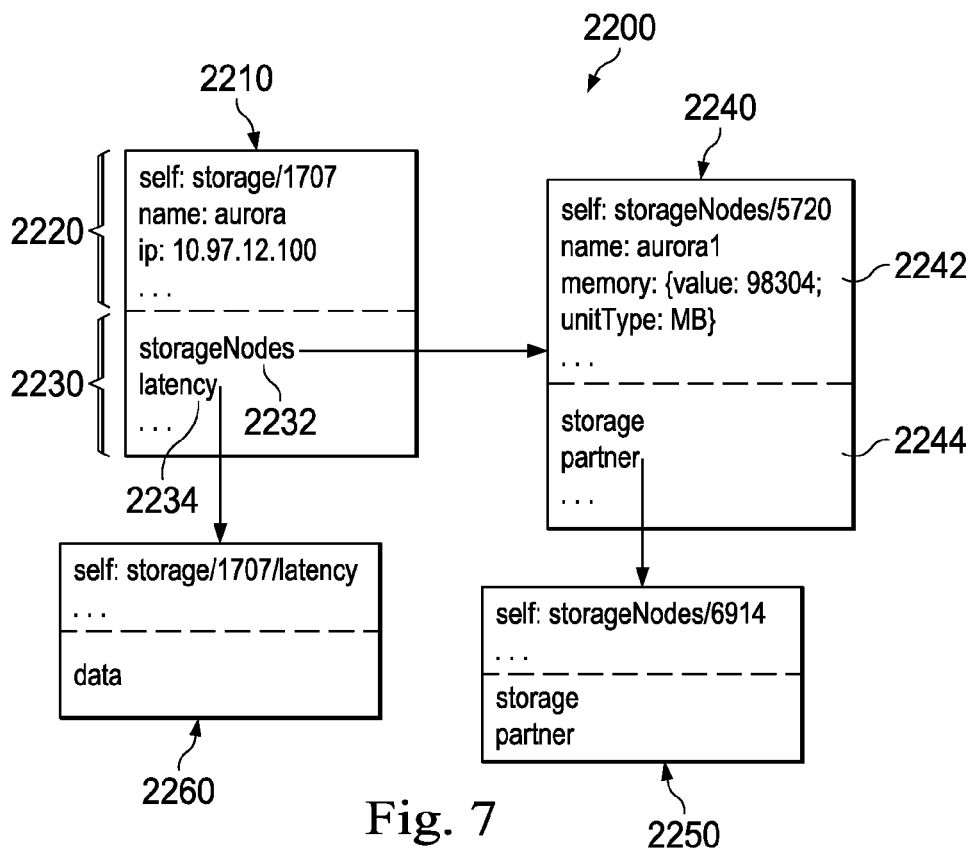
FIG. 7 is a simplified diagram of example hierarchical information associated with storage systems according to one embodiment.

FIG. 7 is a simplified diagram of example hierarchical information 2200 associated with storage systems. In some embodiments, the hierarchical information 2200 may be a portion of the hierarchical information 2170. As shown in FIG. 7, the hierarchical information 2200 includes four nodes 2210, 2240, 2250, and 2260 from a hierarchical description of assets that might be found in a storage system. Node 2210 is representative of a record that may be used to describe a storage component or other storage system asset. As is typical with most nodes in the hierarchical information 2200, node 2210 includes two sections, a by-value section 2220 and a by-reference section 2230. The by-value section 2220 includes a list of properties and their corresponding values associated with node 2210. FIG. 7 shows three representative properties for node 2210 in the by-value section 2220. The "self" property indicates that the URL identifier for node 2210 is "storage/1707". In some examples, the "self" property may be used to uniquely identify and/or index the nodes and their corresponding records. The "name" property indicates a more person friendly name for node 2210, and the "ip" property indicates the IP address assigned to the component.

The by-reference section 2230 includes properties that are references to other nodes or records in the hierarchical information 2200 that are associated with node 2210. These references help build the hierarchy among the nodes. FIG. 7 shows two representative references for node 2210 in the by-reference section 2230. A reference "storageNodes" 2232 describes a link that identifies or points to node 2240 that is a record for the storage nodes that are associated with the storage component for node 2210. A reference "latency" 2234 describes a link that points to node 2260 that is a record for latency data associated with the storage component for node 2210.

Node 2240 is organized similarly to node 2210 and includes both a by-value and a by-reference section. The by-value section includes values for the properties associated with the storage nodes of node 2210, including representative properties for "self", "name", and "memory" 2242.

The "memory" property 2242 demonstrates that compound by-value types may be supported as the "memory" property 2242 includes sub-properties for both "value" and "unit-Type". The by-reference section includes references for both "storage" and "partner" 2244, with the "partner" reference 2244 including a link to node 2250 that is a record for the partner storage node to the storage node recorded in node 2240. Both nodes 2250 and 2260 each include by-value and by-reference sections for record properties and values for the respective nodes as well as the links to other nodes that define other parts of the hierarchy depicted in the hierarchical information 2200.

As discussed above and further emphasized here, FIG. 7 is merely an example which should not unduly limit the scope of the claims. One of ordinary skill in the art would recognize many variations, alternatives, and modifications. In some embodiments, each of the nodes 2210, 2240, 2250, and 2260 may be associated with different types of objects and may each have different numbers and types of properties that correspond to their respective object types. Similarly, each of the nodes 2210, 2240, 2250, and 2260 may have different numbers of references that refer to other nodes of differing types. In some embodiments, the storage system depicted in the hierarchical information 2200 may include additional nodes not shown in FIG. 7.

Figure 8A:
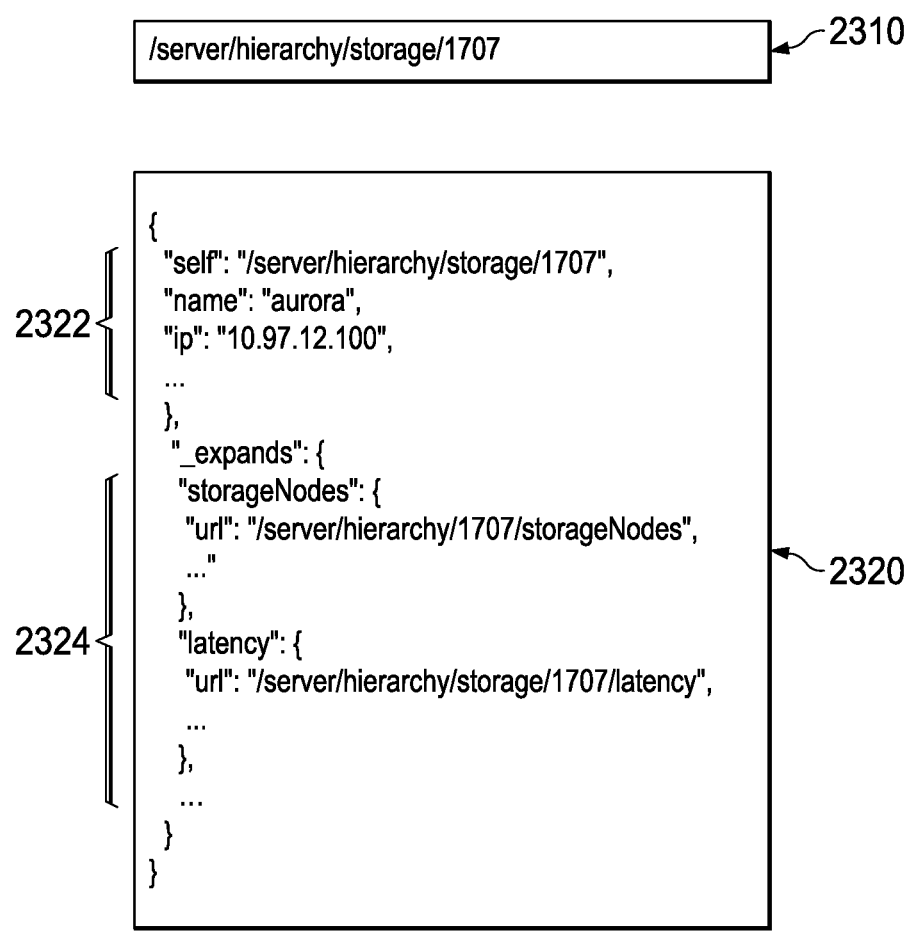
Figure 8B:
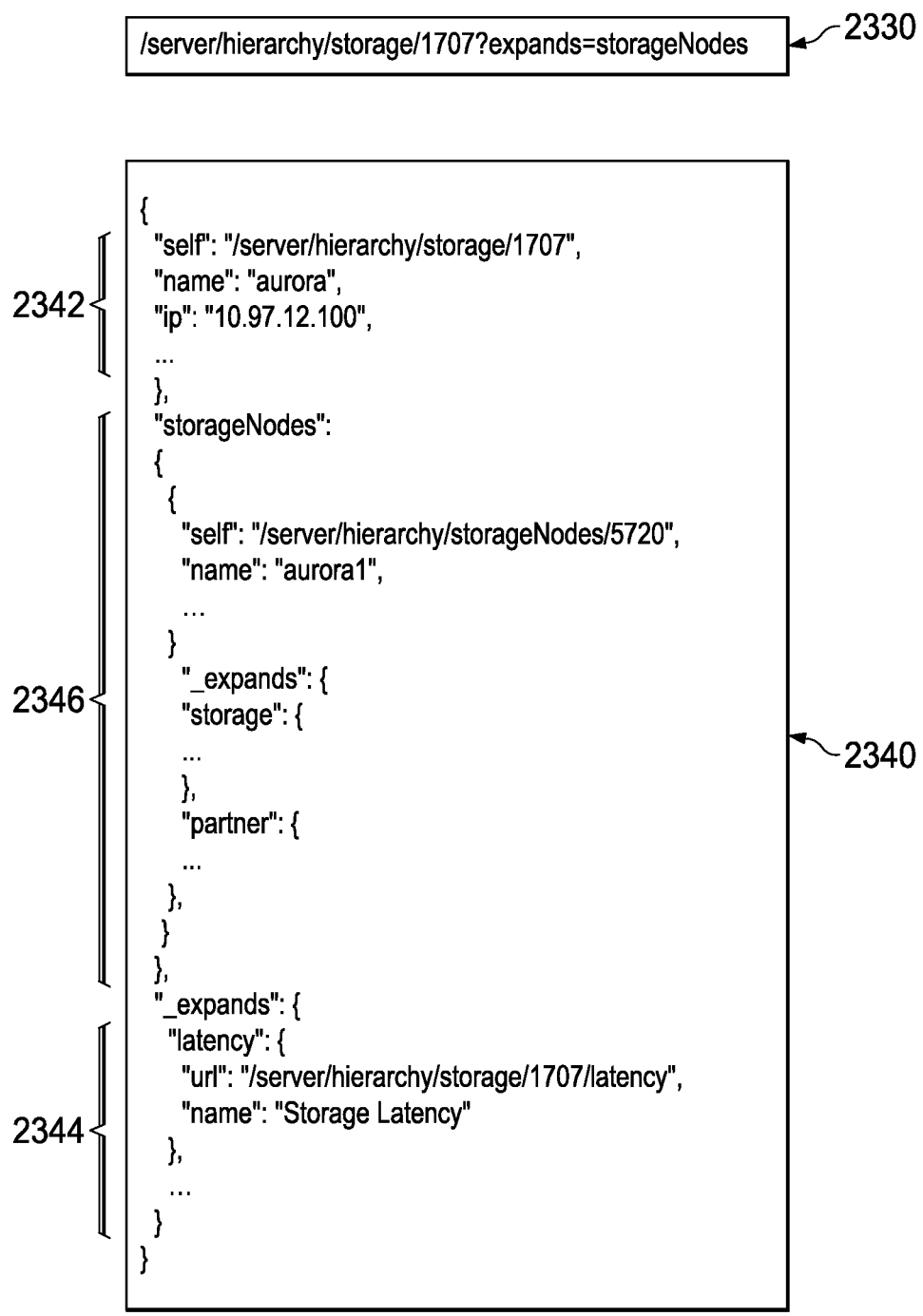

FIGS. 8A-8C are simplified diagrams of example requests and request results used to access portions of the hierarchical information 2200 of FIG. 7. As shown in FIG. 8A, a request 2310 includes a request for the information in the node of the hierarchical information that is associated with the URL "/server/hierarchy/storage/1707" where the "/server/hierarchy" portion of the URL, may be used to identify the server, interface, and/or hierarchical information, such as server 2130 and interface 2160 of FIG. 6 as well as the hierarchical information 2200 of FIG. 7, with the trailing "/storage/1707" requesting information associated with a node identified by the URL identifier "storage/1707" in the hierarchical information 2200. The URL identifier "storage/1707" refers to node 2210, which contains the record for the storage component with a "self" property of "storage/1707". As shown in FIG. 8A, the URL in request 2310 may be provided to the interface using an API call, as part of a get request in a REST web service message, and/or the like.

When the interface, such as interface 2160, receives request 2310, the request interface identifies the requested node in the hierarchy and accesses the record associated with that node, which is node 2210 in the context of FIG. 7. The request interface then extracts the information from node 2210 and prepares a result 2320. Result 2320 shows a representative result in serialized or string form that may be easily returned to the client that made request 2310 as part of a string search result, a REST web service response, and/or the like. To generate result 2320, interface 2160 iterates through both the by-value and by-reference sections of node 2210 to provide each of the properties and/or references included. A by-value section 2322 of response 2320 includes a comma-separated list of each of the properties in by-value section 2220 of node 2210. This includes the "self", "name", and "ip" by-value properties from node 2210. A by-reference section 2324 of response 2320 is introduced with a keyword, "_expands" that introduces the transition between the by-value section 2322 of response 2320 and the by-reference section 2324. The introductory keyword is then followed by a comma-separated list of each of the references in by-reference section 2230 of node 2210. Each of these references is included in the by-reference section 2324 as a compound value that includes the name of the reference and at least a URL for identifying the linked node in the hierarchical information 2200. For example, the "storageNodes" reference 2232 is included in response 2320 by including the reference name, "storageNodes" and the URL "/server/hierarchy/1707/storageNodes" for identifying node 2240, the node linked to by the "storageNodes" reference 2232. This URL may be extracted from response 2320 by the client that made request 2310 to make a follow-up request for the node 2240 using the URL "/server/hierarchy/1707/storageNodes."

As shown, some of the values included in response 2322, such as those associated with URLs, may be altered from the values included in node 2210. As an example, the "self" by-value property is altered from the "storage/1707" in node 2210 to the full URL "/server/hierarchy/storage/1707" that corresponds to the same URL included in request 2310. This altering of URLs supports the ability for the hierarchical information 2200 to be moved from location to location without having to update the internal references as the base URL for the server and interface change. Similar alterations are also shown for the "url" properties associated with the "storageNodes" and "latency" by reference entries.

FIG. 8B shows an example of a more complex request that takes advantage of the flexible ability of the interface to retrieve not just the information associated with a node, but information from other nodes that may or may not be linked using the by-reference information. As shown in FIG. 8B, a request 2330 includes the URL "/server/hierarchy/storage/1707?expands=storageNodes". The base part, "/server/hierarchy/storage/1707", of the URL included in request 2330 is the same as that of the URL included in request 2310 and establishes node 2210 as the base node for request 2330. This informs the interface that the response is to be based on the information in node 2210, which corresponds to the URL "/server/hierarchy/storage/1707". The URL included in request 2330 additionally includes the optional parameter "expands=storageNodes" that is introduced by the question mark separator. The "expands" parameter indicates that the interface is to also add to the response the information associated with the reference with the name "storageNodes" found in the by-reference section of node 2210.

The interface generates a response 2340 to request 2330. A by-value section 2342 of response 2340 includes the same by-value information as the by-value section 2322 in response 2320. Response 2340 also includes a by-reference section 2344, introduced with the "_expands" keyword, with similar reference information as by-reference section 2324 of response 2320. One difference, however, is that the entry for the "storageNodes" reference is omitted in response 2340 because the information from corresponding node 2240 is included in response 2340, so that the "storageNodes" reference entry becomes extraneous. In some embodiments, the "storageNodes" reference entry may alternatively be included in the by-reference section 2344 to make the by-reference section complete.

Response 2340 additionally includes an inserted section 2346 where the information in node 2240 is placed. This inserted section 2346 includes both a comma-separated list of the by-value properties and values of node 2240 as well as a comma-separated list of each of the references in the by-reference section of node 2240, including the URLs for each of the referenced nodes. Thus, as FIG. 8B shows, the interface may be used to retrieve information from two related nodes of the hierarchical information 2200 using one request.

The interface may also be used to retrieve information from nodes that are associated with a chain of reference links from the base node of the request. As shown in FIG. 8C, a request 2350 includes the URL "/server/hierarchy/storage/1707?expands=storageNodes.partner". As with both queries 2310 and 2330, the base part of the URL "/server/hierarchy/storage/1707" establishes node 2210 as the base node for request 2350. The optional parameter "expands/storageNodes.partner" uses a commonly used dot notation to indicate a chain of links or references. More specifically "storageNodes.partner" identifies the "partner" reference of the "storageNodes" reference, which corresponds to node 2250. In response to request 2350, the interface generates a response 2360, which includes a by-value section 2362, an expanded section 2364, and a by-reference section 2366. The by-value section 2362 includes the by-value properties and values of base node 2210, the expanded section 2364 includes the by-value and by-reference sections of node 2250, the by-reference section 2366 includes the reference entries of base node 2210. Unlike the by-reference section 2344 of response 2340, the by-reference section 2366 includes each of the reference entries from node 2210 because the expansion of "storageNodes.partner" does not include all of the information from node 2240.

The interface is also able to handle additional variations in the request URL. In some embodiments, the request URL may request that multiple nodes be included in the expanded section of the result by including a comma-separated list of nodes. For example, a request with a an included URL with a parameter list of "expands=storageNodes,storageNodes.partner" would generate a response with both the expanded section 2346 and the expanded section 2664. In some embodiments, the request URL may use the dot notation to traverse a chain of references of any length. For example, "storageNodes.partner.storage" would refer to the node referenced by the storage reference in node 2250. In some embodiments, the request URL may specify a node that is not related to the base node. In some examples, the additional node may be distantly linked to the base node, unlinked to the base node, and/or even in a hierarchy different from the hierarchy of the base node.

The ability to include references to unrelated nodes, chained nodes, and multiple nodes in the "expands" parameter of the request URL provides significant flexibility in the retrieval of information from a hierarchy. This allows a client or other system the ability to request just the subset of information it desires from the hierarchy using just one request. This may reduce computing resources associated with retrieving, transmitting, and/or parsing extra requests or requests with information that is not of interest.

Figure 9:
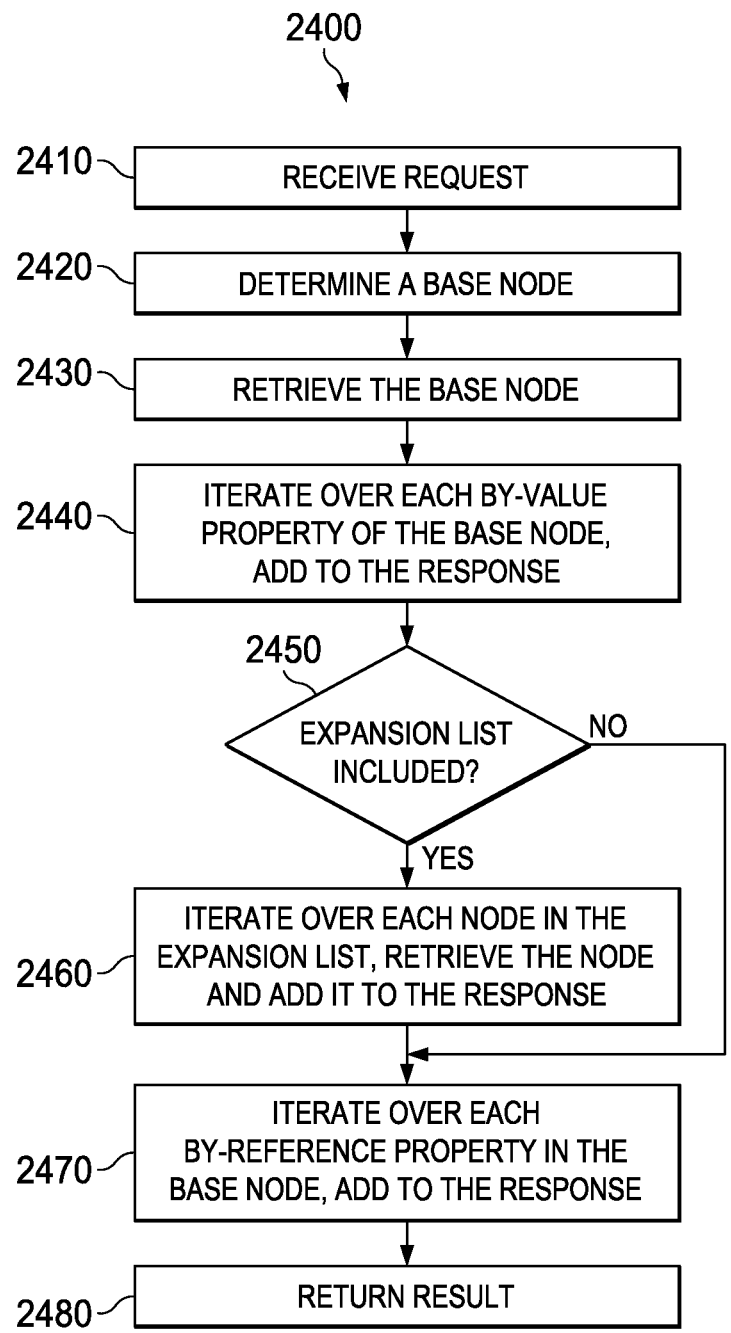
FIG. 9 is a simplified diagram of an example method of hierarchical information request processing according to one embodiment.

FIG. 9 is a simplified diagram of an example method 2400 of hierarchical information request processing. In some embodiments, one or more of the processes 2410-2480 of method 2400 may be implemented, at least in part, in the form of executable code stored on non-transient, tangible, machine readable media that when run by one or more processors (e.g., the processor 2140 of server 2130) may cause the one or more processors to perform one or more of the processes 2410-2480. In some embodiments, method 2400 may be used by interface 2160 to receive and process requests for information from the hierarchical information 2170 and/or the hierarchical information 2200.

At a process 2410, a request is received. The request may be received from a client, such as any of the clients 2111-2119, or a system, such as system monitoring tool 117. The request may be received at an interface, such as interface 2160 using any suitable protocol or method, such as via an API call, a remote procedure call, a REST web services request, a SOAP web services request, and/or the like. The request may include a URL or other parameters and/or mechanisms that identify a base node and any reference nodes that are to be expanded in the response to the request.

At a process 2420, the base node is determined. The request is examined to determine the base node for which information is being requested. When the request is specified by an included URL, the URL may be parsed to identify the base node. In the examples of requests 2310, 2330, and 2350, the base node is the trailing part of the URL, before any parameter list, as identified by the "storage/1707" portion of the request URLs. This identifies the base node as node 2210.

At a process 2430, the base node is retrieved. Using the base node determined during process 2420, the data structure, files, databases, and/or the like containing the hierarchy of information is accessed and the record corresponding to the base node is retrieved.

At a process 2440, each of the by-value properties in the base node are iterated over and added to the response. The record retrieved during process 2430 is examined and the name and value of each of the properties in the by-value section of the record are added to the response. When the response is a string response similar to responses 2320, 2340, and/or 2360, the names and values are serialized in string form, added to a comma-separated list, and offset from the rest of the response using other delimiters such as parentheses, brackets, or curly braces. In some examples, when the value for one of the by-value properties is a compound value, such as the "memory" property 2242 of node 2240, the value portion may be offset by additional delimiters.

At a process 2450, it is determined whether the request includes a list of one or more additional nodes to expand. To support the flexible retrieval of hierarchical information, the request may also include a list of one or more nodes that are also to be included in the response. When the request includes a URL, the URL may be parsed to determine whether there is a parameter list that designates that nodes are to be expanded. In the examples of requests 2330 and 2350, a parameter list with nodes to expand is present in the URL when the parsing detects the question mark separator and the keyword "expands=". The list of nodes to expand follows the keyword "expands=". When the list includes more than one node, they may be separated using a comma or other separator. When the request includes nodes to expand, the nodes are expanded using a process 2460. When the request does not include nodes to expand, the base node is further processed using a process 2470.

At the process 2460, each of the nodes in the expansion list is iterated over, the corresponding node is retrieved, and the node is added to the response. The list of nodes identified during process 2450 is iterated over. For each of the nodes in the list of nodes, the corresponding node is retrieved using a process similar to process 2430, the by-value properties for the node are added to the response using a process similar to process 2440, and the by-reference properties are added to the response using a process similar to process 2470. In the examples of responses 2340 and 2360, the sections 2336 and 2444, respectively, correspond to sections of the response that may be added by process 2460. Each of the nodes in the expansion list may correspond to any node in any hierarchy that is accessible to the interface. When more than one reference or link are specified, the links may be chained together using dot notation, like the dot notation used in request 2350. After each of the nodes in the list is added to the response, the by-reference properties are added to the response using process 2470.

At the process 2470, each of the by-reference properties of the base node are iterated over and added to the response. Process 2470 may begin by adding a keyword or other separator in the response to indicate that the response now includes references that are expandable. In the examples of responses 2320, 2340, and 2360, the keyword "_expands" is used to indicate the transition to by-reference properties. The record retrieved during process 2430 is examined and the name and link for each of the references in the by-reference section of the record are added to the response. When the response is a string response similar to responses 2320, 2340, and/or 2360, the names and links are serialized in string form, added to a comma-separated list, and offset from the rest of the response using other delimiters such as parentheses, brackets, or curly braces. In some embodiments, when any of the references correspond to a node that is included in the expansion list and is already included in the response, the name and link for the corresponding reference may be omitted from the response.

At a process 2480, the response is returned. The response is returned to the client or system that made the request received during process 2410. When the request was made using an API call, the response may be included as the return value to the call. When the request was made using a remote procedure call, web service, and/or the like, the response may be returned in a response message to the client or system.

Figure 10:
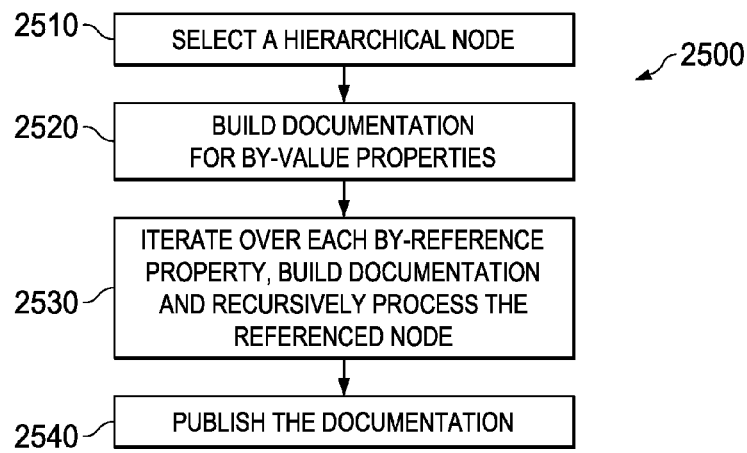
FIG. 10 is a simplified diagram of an example method 2500 of documentation generation for hierarchical information according to one embodiment.

FIG. 10 is a simplified diagram of an example method 2500 of documentation generation for hierarchical information. In some embodiments, one or more of the processes 2510-2540 of method 2500 may be implemented, at least in part, in the form of executable code stored on non-transient, tangible, machine readable media that when run by one or more processors (e.g., the processor 2140 of server 2130) may cause the one or more processors to perform one or more of the processes 2510-2540. In some embodiments, method 2500 may be used by interface 2160 to prepare and make available documentation for the hierarchical information 2170 and/or the hierarchical information 2200.

At a process 2510, a hierarchical node is selected. The preparation of documentation for a collection of records associated with hierarchical information begins when a node in the hierarchy is selected. In some embodiments, the hierarchical node may be selected by iterating through each of the hierarchical records that form one or more hierarchies. In some embodiments, the hierarchical node is selected as the node in the hierarchical information that is the head node for a tree or graph that represents the hierarchical information. In some embodiments, the hierarchical node may be selected by receiving the hierarchical node as a parameter in an API call, a web services request, and/or the like.

At a process 2520, documentation is built for each of the by-value properties of the hierarchical node. The record associated with the hierarchical node selected during process 2510 is retrieved using a process similar to process 2430. Once the record is retrieved, each of the by-value properties in the record are iterated over and corresponding documentation is built. This may include adding the name of the by-value property to the documentation including other information associated with the by-value property. This other information may include value and/or metadata information associated with the by-value property.

At a process 2530, each of the by-reference properties of the hierarchical node are iterated over, documentation is built, and the referenced node is recursively processed. The record retrieved during process 2520 is examined to determine each of the by-reference properties of the hierarchical node. Documentation is built for each of the by-reference properties that include at least a name of the by-reference property and a link, such as a web link, are added to the documentation. The link may be used to point to documentation associated with the referenced node. This documentation may be built by recursively invoking method 2500 where the referenced node becomes the hierarchical node selected during process 2510.

At a process 2540, the documentation is published. Once the documentation is assembled, it is made available to users, clients, and other systems. In some embodiments, this may be done by placing the documentation on a server where an interface may be used to access the documentation. In some examples, the documentation may be stored in a collection of files stored on a web server where the documentation for each node may be accessed and corresponding hyperlinks may be used to follow the links between nodes. In some examples, the documentation may be placed in one or more files and/or databases accessible by a help system. The help system may receive requests that identify nodes, access the files and/or databases, and retrieve the documentation associated with the requested node.

Figure 11:
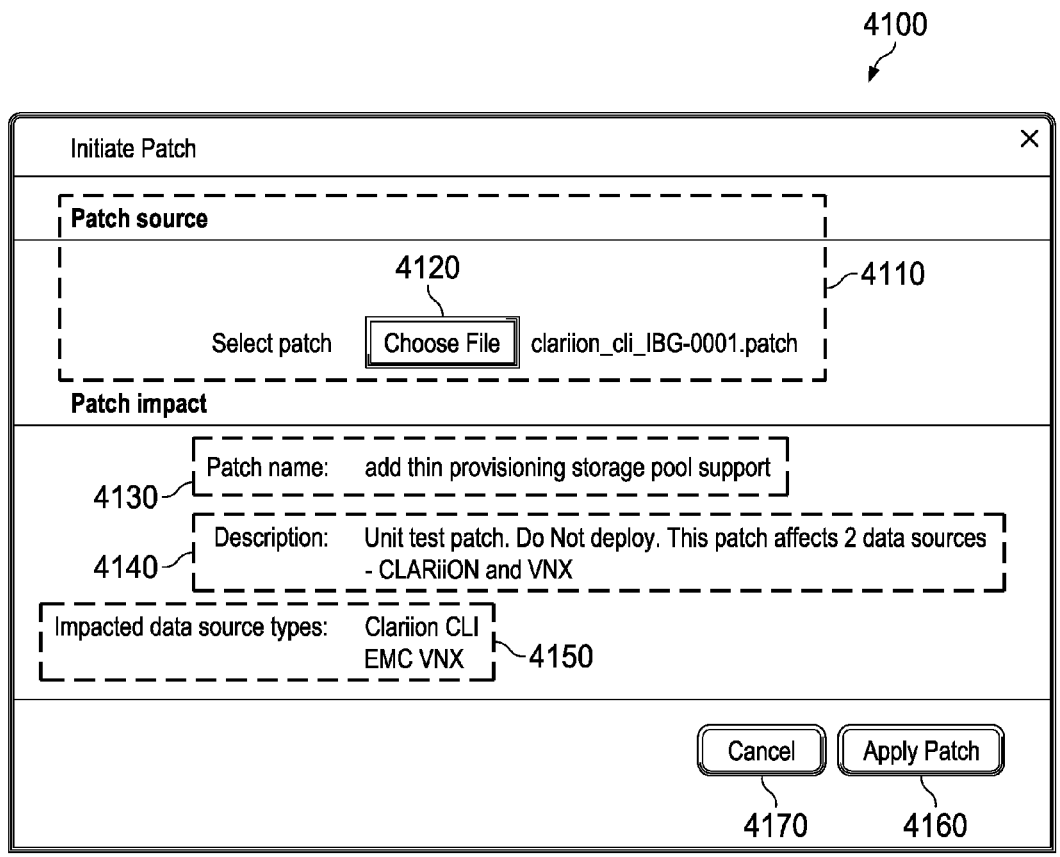
FIG. 11 is a simplified diagram of an example user interface screen for reviewing and applying patches according to one embodiment.

FIG. 11 is a simplified diagram of an example user interface screen 4100 for reviewing and applying patches. Screen 4100 may be accessed using an initiate patch menu item or other similar user interface control of, for example, system monitoring tool 117. As shown in FIG. 11, screen 4100 provides information about a selected patch to a user or storage system administrator. And although screen 4100 is shown in the context of a pop-up dialog box, one of ordinary skill would understand that other arrangements or display methods are possible. In a patch source region 4110 of screen 4100, the user is able to select a patch. The patch source region 4110 identifies the selected patch and includes one or more interface controls for accessing a list of other available patches using a drop down menu, pop-up menu, or a pop-up patch selection dialog like a file selection dialog or similar. In the example of FIG. 11, a button 4120 is used to access a pop-up patch selection dialog for selecting the patch from a list of patches stored in files. In some embodiments, the patch management subsystem or tool may determine a list of available patches by searching one or more support servers provided by the vendors of the assets or by updating services that collect and make available patches. For example, NetApp, Inc. of Sunnyvale, Calif. provides such an update service for its storage system customers.

Screen 4100 may further be used to display name 4130 and description 4140 information for the patch. Screen 4100 may also provide a list of asset types 4150 to which the patch applies. The name 4130, description 4140, and/or list of asset types 4150 may be used by the user to determine whether the patch is of interest and/or to which storage system assets the patch may apply.

To facilitate application of the selected patch, screen 4100 may also include one or more controls for having the patch management tool apply the patch. In the example of screen 4100 an "Apply Patch" button 4160 is provided. When button 4160 is activated, the patch management tool may identify each of the assets in the storage system of a type included in the list of asset types 4150, and then apply the selected patch to each of the identified assets. In some embodiments, the patch management tool may determine the identified assets and display them along with the list of asset types 4150 so that the user may know which specific assets may be affected by application of the patch.

Screen 4100 may also include other interface controls for managing screen 4100. For example, "Cancel" button 4170 may be used to exit screen 4100 and return to a previous interface screen.

FIG. 12 is a simplified diagram of an example user interface screen for reviewing previously applied patches. The patch review screen may be accessed using a review applied patches menu item or other similar user interface control of, for example, system monitoring tool 117. As shown in FIG. 12, the patch review screen displays a tabular list 4200 of previously applied patches to the user. And although the patch review screen is shown in the form of tabular list 4200 that may appear as part of a larger review screen, one of ordinary skill would understand that other arrangements or display methods are possible. The patch review list 4200 includes several columns that may be of interest to a user. A patch column 4210 lists a short name for each of the patches. A recommendation column 4220 includes a recommendation that the patch management tool is making with respect to each patch. A details column 4230 includes additional information that may be useful to the user in evaluating the recommendation. A deployed since column 4240 indicates how long each patch has been applied to assets and may use one or more units to display the amount of time since the patch was applied. And a number of assets column 4250 indicates how many assets the patch has been applied to. In some embodiments, each of the entries in the patch column 4210 may be an active interface control that allows the user to receive more information about the corresponding patch and the recommendation.

The patch recommendation column 4220 may include one of many recommendations regarding the proposed future status of the respective patches. In some examples, the patch management tool may recommend that a patch be approved, such as is shown for the IBM SVC patch. An approval recommendation may be based on monitoring of each of the assets to which the patch has been applied to determine whether the status of each of the assets has improved or has not been adversely affected by the patch. As shown for the IBM SVC patch, application of the patch has resulted in a reduction in errors. In some examples, the patch management system may recommend that a patch be rolled back, such as is shown for the CLARION CLI patch. A roll back recommendation may be made when monitoring of the affected assets results in adverse results for the various assets. In some examples, other recommendations can include waiting for further verification of the patch, replacing the patch with a newer patch, and/or the like. In some embodiments, each of the entries in the patch recommendation column 4220 may be active interface controls that allow the user to implement the recommended action. For example, clicking on an "Approve Patch" recommendation may approve the patch and remove it from the list of monitored patches. In some embodiments, each of the entries in the patch recommendation column 4220 may include a drop-down or other menu control allowing the user to select any of the patch management actions including approve, rollback, replace, and/or the like.

FIG. 13 is a simplified diagram of an example user interface screen for reviewing how a previously applied patch has impacted assets. The patch asset review screen may be accessed using a patch asset review menu item, the active screen controls in the entries of the patch column 4210, and/or other similar user interface controls of, for example, system monitoring tool 117. As shown in FIG. 13, the patch asset review screen displays a tabular list 4300 of assets affected by a previously applied patch. And although the patch asset review screen is shown in the form of tabular list 4300 that may appear as part of a larger review screen, one of ordinary skill would understand that other arrangements or display methods are possible. The patch asset review list 4300 includes several columns that may be of interest to a user. An asset column 4310 lists a short name for each of the assets to which the patch has been applied. A conclusion column 4320 includes a summary of change in status of the respective asset. A pre-patch status column 4330 includes a summary of the status of the respective assets before the patch was applied. A post-patch status column 4340 includes a summary of the status of the respective assets after the patch has been applied. In some embodiments, each of the entries in the asset column 4310 may be an active interface control that allows the user to receive more information about the patches that have been applied to the respective asset. In some embodiments, the patch asset review screen may include further information regarding the patch. For example, information similar to that shown on screen 4100 may also be displayed on the patch asset review screen.

As the patch management system monitors the assets to which patches are applied, it generally tracks three types of status information. Polling status determines whether the storage asset management system is able to communicate with the respective assets. In some examples, this may include the ability of the asset to respond to ping or other echo-type messages sent to the asset by the storage management system. Configuration status determines whether the storage asset management system is able to send configuration and/or provisioning instructions to the asset and have the asset be able to confirm that the configuration and/or provisioning is applied successfully. Because configuration and/or provisioning is often more complex than polling, the configuration status may reflect different types of problems and/or errors associated with different aspects of the configuration and/or provisioning. Performance status is based on monitoring of various performance metrics for the asset including latency, IOPS, throughput, CPU usage, memory usage, IP throughput, and/or the like. As with configuration status, the performance status may reflect different types of performance failures. For example, a patch may improve latency for an asset, but result in a reduction in throughput.

The entries in the conclusion column 4320 provide a summary of the differences between the pre-patch status and the post-patch status. This summary may include whether the overall status of the asset has improved (e.g., previously couldn't be polled, but is now able to be polled) or whether the status has changed (e.g., configuration is still failing, but with different errors). The entries in the conclusions column 4320 are then aggregated to form the corresponding entries in the details 4230 and recommendation 4220 columns of the patch review screen of FIG. 12.

Figure 14:
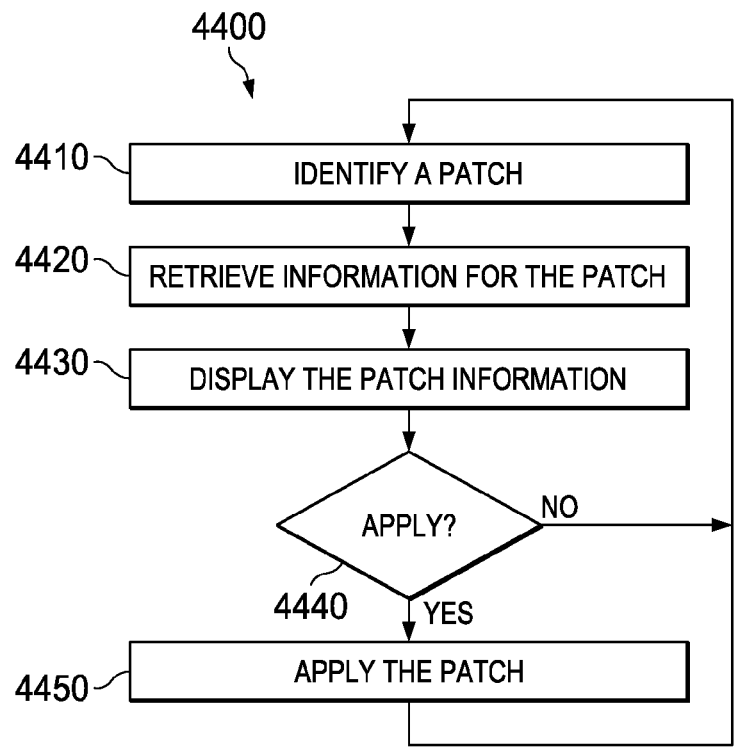
FIG. 14 is a simplified diagram of an example method of patch management according to one embodiment.

FIG. 14 is a simplified diagram of an example method 4400 of patch management. In some embodiments, one or more of the processes 4410-4450 of method 4400 may be implemented, at least in part, in the form of executable code stored on non-transient, tangible, machine readable media that when run by one or more processors (e.g., processors associated with a patch management tool, a storage asset management tool, and/or system monitoring tool 117) may cause the one or more processors to perform one or more of the processes 4410-4450. In some embodiments, method 4400 may be performed by system monitoring tool 117.

At a process 4410, a patch is identified. Using one or more possible input methods, a patch to be managed is identified. In some examples, this may include a user or storage system administrator using an interface control on an interface screen, such as button 4120 on screen 4100, to select and/or identify the patch.

At a process 4420, information is retrieved for the patch. Metadata and other information associated with the patch identified in process 4410 is retrieved. In some examples, this may include reading a file associated with the patch to determine the patch information. In some examples, one or more data structures, databases, and/or the like may be queried to determine the patch information. The patch information may include a name of the patch, a description of the patch, a list of asset types to which the patch may be applied, and/or the like. In some examples, the patch information may additionally include a list of assets to which the patch may be applied.

At a process 4430, the patch information is displayed. Using an interface screen, such as interface screen 4100 the patch information retrieved during process 4420 is displayed to the user.

At a process 4440, it is determined whether the patch is to be applied. The user may review the patch information displayed during process 4430 and make a determination as to whether the patch is to be applied. This decision may be based on displayed patch information and/or additional information that the user may obtain from other sources. The user may indicate an affirmative decision to apply the patch by activating a user interface control for that purpose, such as the "Apply Patch" button 4160. When the patch is to be applied, it is applied using a process 4450. When the patch is not to be applied, process 4450 may be skipped and another patch may be identified using process 4410.

At the process 4450, the patch is applied. When the patch is to be applied, the patch management tool may identify each of the assets in the storage system of a type included in the list of asset types associated with the patch that were retrieved during process 4420. This may include accessing one or more data structures, files, and/or data bases describing each of the assets in the storage system and comparing the types of those assets to the type in the list of asset types. When assets are identified with a matching asset type, the patch is applied to that asset. The patch management tool may apply the patch by sending one or more messages and/or instructions to the asset along with the patch that direct the asset to apply the patch. In some examples, as the patch is applied to each asset, the patch management tool may record this in one or more data structures, files, databases, and/or the like. Once the patch is applied to each of the identified assets, another patch may be identified using process 4410.

Figure 15:
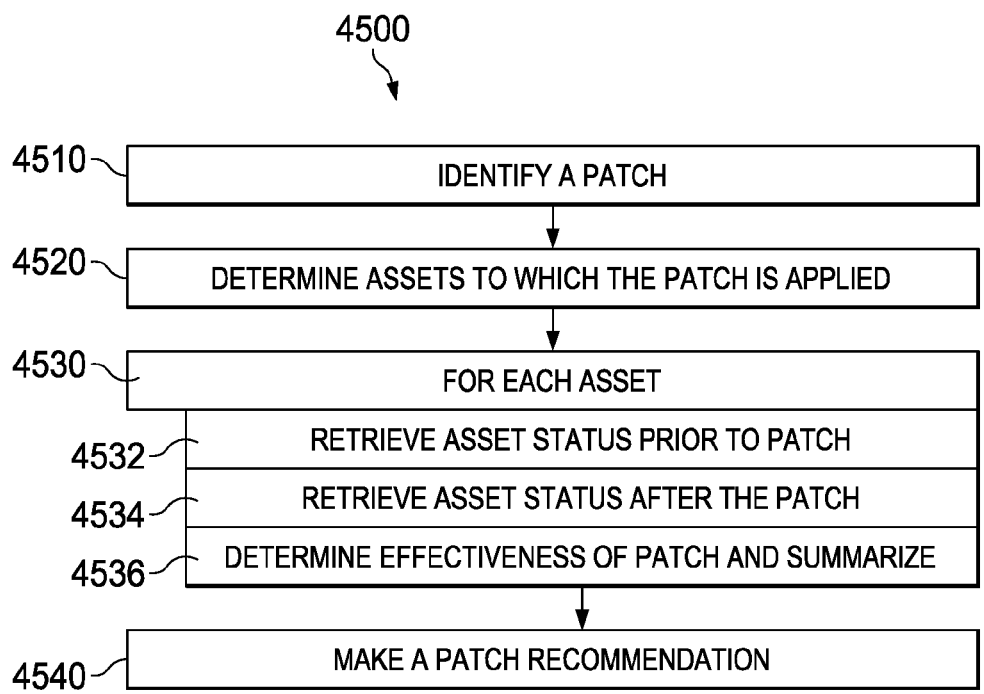
FIG. 15 is a simplified diagram of an example method of patch monitoring according to one embodiment.

FIG. 15 is a simplified diagram of an example method 4500 of patch monitoring. In some embodiments, one or more of the processes 4510-4540 of method 4500 may be implemented, at least in part, in the form of executable code stored on non-transient, tangible, machine readable media that when run by one or more processors (e.g., processors associated with a patch management tool, a storage asset management system, and/or system monitoring tool 117) may cause the one or more processors to perform one or more of the processes 4510-4540. In some embodiments, method 4500 may be performed by system monitoring tool 117. In some embodiments, method 4500 may be performed for each patch being monitored by system monitoring tool 117. In some embodiments, method 4500 may be used to provide the information displayed on the interface screens of FIGS. 12 and/or 13.

At a process 4510, a patch is identified. In some embodiments, one or more possible input methods may be used to identify a patch that is to be monitored. In some examples, this may include a user or storage system administrator using an interface control on an interface screen, such as a button similar to button 4120 on screen 4100, to select and/or identify the patch. In some embodiments, the identified patch may be selected from a list of patches maintained by the patch management tool in one or more data structures, files, databases, and/or the like. In some examples, the list of patches may include patches that have been applied, but have not yet been approved, rolled back, and/or replaced.

At a process 4520, the assets to which the patch is applied are determined. In some embodiments, as the patch identified during process 4510 is applied to storage assets, such as during process 4450, the patch management tool may retain a record of each of those assets and associate them with the identified patch. In some embodiments, the assets may be determined by querying the assets being managed by the storage asset management system to see whether those assets have applied the patch and/or retrieving the information from one or more data structures, files, databases, and/or the like.

At a process 4530, each of the assets to which the patch is applied is further monitored. Several sub-processes 4532-4536 are then applied to each of the assets in turn.

At the sub-process 4532, the status of the asset prior to the application of the patch is retrieved. The patch management tool accesses the one or more data structures, files, databases, and/or the like into which the storage asset management system logs status information for the assets. This includes retrieving information on whether the asset was responding to polling requests, was successfully configured, and/or was demonstrating suitable performance during a time period prior to the application of the patch. The retrieved information may further include information about different types of errors received when monitoring and/or managing the asset and/or performance data associated with the asset.

At the sub-process 4534, the status of the asset after the application of the patch is retrieved. Similar to sub-process 4532, status information related to polling, configuration, and/or performance associated with the asset during a time period after the patch was applied is retrieved.

At the sub-process 4536, effectiveness of the patch is determined and summarized. The patch management tool makes one or more comparisons between the retrieved status information from both before and after when the patch was applied. Based on changes in the status, including the polling, configuration, and/or performance capabilities of the asset, the effectiveness of the patch is determined for the asset and a summary is generated. In some embodiments, the effectiveness of the patch and the summary may be sufficient to fill in a row of a patch asset review list similar to the patch asset review list 4300.

At a process 4540, a patch recommendation is made. The patch management system aggregates the patch effectiveness and summary determined during sub-process 4546 to make a recommendation regarding whether the patch is to be approved, rolled back, replaced, and/or the like. In some embodiments, the recommendation may be based on counts of how many of the assets are positively affected by the patch versus how many of the assets are negatively affected by the cache. When all and/or a majority of the assets are positively affected by the patch, the recommendation may be to approve the patch. When a majority and/or even some of the assets are negatively affected by the path, the recommendation may be to roll back and/or replace the patch. In some examples, a recommendation to replace the patch may additionally be based on whether another, potentially newer, patch is available for each of the assets to which the patch is applied. In some examples, when insufficient information is available to determine asset status after application of the patch, the recommendation may include waiting for further status monitoring. In some embodiments, the recommendation and/or aggregation may be sufficient to fill in a row of a patch review list similar to patch review list 4200.

In some embodiments, the patch management tool may further support implementation of the recommendation. For example, when the recommendation is roll back and is approved by the user, the patch management system may roll back the patch by sending one or more messages and/or instructions to the asset instructing the asset to roll back the patch.

It should be noted that the examples above are given in the context of a network storage system, through the scope of embodiments is not so limited. Rather, the concepts described above may be implemented in any type of computing cluster, wherein performance data is sampled and analyzed. One example embodiment includes a cluster of server nodes, where performance data for the server nodes themselves, as well as for the applications running on the server nodes, is sampled according to a workload of each node or application. Process 400 would transfer the sampled data to an analysis application for further processing.

When implemented via computer-executable instructions, various elements of embodiments of the present disclosure are in essence the software code defining the operations of such various elements. The executable instructions or software code may be obtained from a non-transient, tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

In the embodiments described above, example clients 160, server 110, storage controllers 101, and server 2130 include processor-based devices and may include general-purpose processors or specially-adapted processors (e.g., an Application Specific Integrated Circuit). Such processor-based devices may include or otherwise access the non-transient, tangible, machine readable media to read and execute the code. By executing the code, the one or more processors perform the actions of the processes of FIGS. 4, 9, 10, 14, and 15.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of managing software updates, the method performed by an application hosted in a server, the method comprising:

identifying by the application a software update for a networked storage system with computer system assets for storing and retrieving data;

retrieving metadata associated with the software update, where the metadata provides a path where the software update is stored, identifies a list of asset types to which the software update can be applied and identifies one or more assets to which the software update can be applied;

applying the software update to a plurality of computer system assets based on the retrieved metadata;

for monitoring the software update, identifying the software update applied to the plurality of computer system assets of the networked storage system that are determined by an asset type;

identifying the plurality of computer system assets to which the software update has been applied by querying the plurality of computer system assets;

monitoring a status of the plurality of computer system assets after the software update and storing the status of the plurality of computer system assets before and after the software update is applied;

retrieving a first status of a first one of the assets from a first time period before the software update was applied to the first asset indicating if the first asset could be successfully polled, and had an acceptable configuration status and performance status, where the configuration status provides an indication of whether the first asset confirmed successful application of any configuration and provisioning instructions sent to the first asset from the first time period;

retrieving a second status of the first asset from a second time period after the software update was applied to the first asset indicating if the first asset could be successfully polled and had an acceptable configuration status and performance status;

determining an effectiveness of the software update for the first asset based on comparing the first status and the second status indicating whether an overall status of the first asset improved after the software update; and displaying within a Graphical User Interface (GUI) an identification of the software update, an identification of the first asset, a number of assets to which the software update has been applied; a duration for which the software update has been deployed and a recommendation for the software update based on the effectiveness of the software update for the first asset.

2. The method of claim 1 wherein the first status is based on an ability of the first asset to respond to echo requests.

3. The method of claim 1 wherein the first status is based on an ability of the first asset to be configured.

4. The method of claim 1 wherein the first status is based on performance information associated with the first asset during the first time period.

5. The method of claim 1 wherein the recommendation is selected from a group consisting of an approval recommendation, a roll back recommendation, and a replace recommendation.

6. The method of claim 1 wherein retrieving the first status comprises reading one or more logs associated with the first asset.

7. The method of claim 1 further comprising:

reading one or more records retained from when the software update was applied to the plurality of assets to determine which assets of the plurality of assets have the software update.

8. The method of claim 1, further comprising:
retrieving a third status of a second one of the assets asset from a third time period before the software update was applied to the second asset;
retrieving a fourth status of the second asset from a fourth time period after the software update was applied to the second asset;
determining an effectiveness of the software update for the second asset by comparing the third status and the fourth status; and
further displaying within the GUI an identification for the second asset, and a recommendation for the software update further based on the effectiveness of the software update for the second asset.

9. A system for managing software updates to a plurality of computer system assets of a networked storage system, the system comprising:
a processor; and
memory accessible by the processor and storing computer-readable instructions, the processor performing the following actions by executing the instructions:
identifying by the application a software update for the networked storage system with computer system assets for storing and retrieving data;
retrieving metadata associated with the software update, where the metadata provides a path where the software update is stored, identifies a list of asset types to which the software update can be applied and identifies one or more assets to which the software update can be applied;
applying the software update to a plurality of computer system assets based on the retrieved metadata;
for monitoring the software update, identifying the software update applied to the plurality of computer system assets of the networked storage system that are determined by an asset type;
identifying the plurality of computer system assets to which the software update has been applied by querying the plurality of computer system assets;
monitoring a status of the plurality of computer system assets after the software update and storing the status of the plurality of computer system assets before and after the software update is applied;
retrieving a first status of a first one of the assets from a first time period before the software update was applied to the first asset indicating if the first asset could be successfully polled, and had an acceptable configuration status and performance status, where the configuration status provides an indication of whether the first asset confirmed successful application of any configuration and provisioning instructions sent to the first asset from the first time period;
retrieving a second status of the first asset from a second time period after the software update was applied to the first asset indicating if the first asset could be successfully polled and had an acceptable configuration status and performance status;
determining an effectiveness of the software update for the first asset based on comparing the first status and the second status indicating whether an overall status of the first asset improved after the software update; and
displaying within a Graphical User Interface (GUI) an identification of the software update, an identification of the first asset, a number of assets to which the software update has been applied; a duration for which the software update has been deployed and a recommendation for the software update based on the effectiveness of the software update for the first asset.

10. The system of claim 9, wherein the processor and memory are located in a server in the network storage system, and the actions are being performed by an application on a virtual machine.

11. The system of claim 10, wherein the application on the virtual machine monitors computer system assets of the network storage system.

12. The system of claim 9, wherein processor retrieves the first and second statuses from a system log, the system log comprising:
a plurality of records, the records including information regarding whether the first asset was responding to polling requests; information regarding whether the first asset was successfully configured; information regarding whether the first asset was performing during a time period prior to the application of the software update; and information regarding errors of the first asset.

13. The system of claim 9 wherein the first status is based on an ability of the first asset to respond to echo requests.

14. The system of claim 9 wherein the first status is based on an ability of the first asset to be configured.

15. The system of claim 9 wherein the first status is based on performance information associated with the first asset during the time period before the software update was applied to the first asset.

16. A computer program product having a non-transitory, computer readable medium tangibly recording computer program logic for managing software updates for a plurality of computer system assets of a networked storage system in communication with a software update management tool, the computer program product comprising:
code to identify a software update for the networked storage system;
code to retrieve metadata associated with the software update, where the metadata provides a path where the software update is stored, identifies a list of asset types to which the software update can be applied and identifies one or more assets to which the software update can be applied;
code to apply the software update to the plurality of computer system assets based on the retrieved metadata;
for monitoring the software update, code to identify the software update applied to the plurality of computer system assets;
code to identify the plurality of computer system assets to which the software update has been applied by querying the plurality of computer system assets;
code to monitor a status of the plurality of computer system assets after the software update and storing the status of the plurality of computer system assets before and after the software update is applied;
code to access a system log having status information for the plurality of computer system assets of the networked storage system;
code to retrieve from the system log a first status of a first one of the assets from before a software update was applied to the first asset indicating if the first asset could be successfully polled, and had an acceptable configuration status and performance status, where the configuration status provides an indication of whether the first asset confirmed successful application of any configuration and provisioning instructions sent to the first asset;

code to retrieve from the system log a second status of the first asset after the software update was applied to the first asset indicating if the first asset could be successfully polled and had an acceptable configuration status and performance status;

code to compare the first status and the second status to determine a change in the first asset attributable to the software update indicating whether an overall status of the first asset improved after the software update; and code to render a Graphical User Interface (GUI) having visual depictions of an identifier of the asset, an identifier of the software update, a duration for which the software update has been deployed and a number of assets to which the software update has been applied and information indicating the change in the first asset attributable to the software update.

17. The computer program product of claim 16, further comprising:

code to display within the GUI information for additional assets and additional software updates.

18. The computer program product of claim 16 wherein the first status is based on an ability of the first asset to respond to echo requests.

19. The computer program product of claim 16 wherein the first status is based on an ability of the first asset to be configured.

20. The computer program product of claim 16 wherein the first status is based on performance information associated with the first asset during the first time period.

* * * * *